(12) United States Patent
Walker et al.

(10) Patent No.: US 10,949,649 B2
(45) Date of Patent: Mar. 16, 2021

(54) REAL-TIME TRACKING OF FACIAL FEATURES IN UNCONSTRAINED VIDEO

(71) Applicant: Image Metrics, Ltd., El Segundo, CA (US)

(72) Inventors: Kevin Walker, Sheffield (GB); Mike Rogers, Venice, CA (US); Mike Taylor, Urmston (GB); Matthew Oakes, Withington (GB); Vincent Drouard, Manchester (GB); Carl Moore, Bolton (GB)

(73) Assignee: Image Metrics, Ltd., El Segundo, CA (US)

( * ) Notice: Subject to any disclaimer, the term of this patent is extended or adjusted under 35 U.S.C. 154(b) by 57 days.

(21) Appl. No.: 16/282,989

(22) Filed: Feb. 22, 2019

(65) Prior Publication Data

US 2020/0272806 A1   Aug. 27, 2020

(51) Int. Cl.
*G06K 9/00* (2006.01)
*G06K 9/62* (2006.01)
*G06T 7/73* (2017.01)

(52) U.S. Cl.
CPC ....... *G06K 9/00248* (2013.01); *G06K 9/6256* (2013.01); *G06T 7/74* (2017.01); *G06T 2207/10016* (2013.01); *G06T 2207/20081* (2013.01); *G06T 2207/20084* (2013.01); *G06T 2207/30201* (2013.01)

(58) Field of Classification Search
None
See application file for complete search history.

(56) References Cited

U.S. PATENT DOCUMENTS 5,016,282 A   5/1991   Tomono et al.
5,659,625 A   8/1997   Marquardt
(Continued)

OTHER PUBLICATIONS

Cham, et al., "A Multiple Hypothesis Approach to Figure Tracking," *Compaq Computer Corporation*, Cambridge Research Laboratory, Technical Report Series, CRL 98/8, 16 pages (Jul. 1998).

(Continued)

*Primary Examiner* — Shervin K Nakhjavan
(74) *Attorney, Agent, or Firm* — Sunstein LLP

(57) ABSTRACT

A method for locating and tracking facial features in an unconstrained video sequence includes: in a face-detecting process, delineating, with region-bounding coordinates, the face of the subject within an image selected from the sequence; detecting, in the selected image, a small set of landmarks, corresponding to the face of the subject, using a convolutional neural network, trained to take as input an image region corresponding to the face of the—subject and to return a set of coordinates at computational speeds approximating real time; projectively fitting a three-dimensional character model to the detected landmarks, and using the fitted model to estimate physical locations of additional landmarks, so as to provide a complete hypothesized set of facial landmarks; and in a feature tracker process, updating the hypothesized set of facial landmarks to improve convergence between predicted feature locations and their actual physical locations based on data sampled from the selected image.

9 Claims, 17 Drawing Sheets
(10 of 17 Drawing Sheet(s) Filed in Color)

(56) References Cited

U.S. PATENT DOCUMENTS

| | | | |
|---|---|---|---|
| 5,854,850 | A | 12/1998 | Linford et al. |
| 5,933,527 | A | 8/1999 | Ishikawa |
| 6,091,836 | A | 7/2000 | Takano et al. |
| 6,396,599 | B1 | 5/2002 | Patton et al. |
| 6,502,583 | B1 | 1/2003 | Utsugi |
| 6,556,196 | B1 | 4/2003 | Blanz et al. |
| 6,580,810 | B1 | 6/2003 | Yang et al. |
| 6,719,565 | B1 | 4/2004 | Saita et al. |
| 7,099,510 | B2 | 8/2006 | Jones et al. |
| 7,127,081 | B1 | 10/2006 | Erdem |
| 7,619,638 | B2 | 11/2009 | Walker, Jr. et al. |
| 7,634,103 | B2 | 12/2009 | Rubinstenn et al. |
| 7,916,904 | B2 | 3/2011 | Suzuki et al. |
| 8,064,648 | B2 | 11/2011 | Takano et al. |
| 8,082,926 | B2 | 12/2011 | Yano et al. |
| 8,107,672 | B2 | 1/2012 | Goto |
| 8,498,456 | B2 | 7/2013 | Legagneur et al. |
| 9,104,908 | B1 | 8/2015 | Rogers et al. |
| 9,633,250 | B2 | 4/2017 | Tuzel et al. |
| 10,489,912 | B1* | 11/2019 | Brailovskiy ......... H04N 13/246 |
| 2005/0169536 | A1 | 8/2005 | Accomazzi et al. |
| 2006/0023923 | A1 | 2/2006 | Geng et al. |
| 2006/0133672 | A1 | 6/2006 | Li |
| 2008/0130961 | A1 | 6/2008 | Kinoshita |
| 2009/0153569 | A1 | 6/2009 | Park et al. |
| 2010/0111370 | A1 | 5/2010 | Black et al. |
| 2010/0271368 | A1 | 10/2010 | McNamara et al. |
| 2010/0302258 | A1 | 12/2010 | Epps et al. |
| 2011/0110561 | A1 | 5/2011 | Havaldar |
| 2012/0130717 | A1 | 5/2012 | Xu et al. |
| 2012/0308123 | A1 | 12/2012 | Jo et al. |
| 2013/0148852 | A1 | 6/2013 | Partis et al. |
| 2013/0235045 | A1 | 9/2013 | Corazza et al. |
| 2014/0022249 | A1 | 1/2014 | Ye et al. |
| 2014/0035901 | A1 | 2/2014 | Chen et al. |
| 2014/0307063 | A1 | 10/2014 | Lee |
| 2015/0139485 | A1* | 5/2015 | Bourdev ............. G06K 9/6292 382/103 |
| 2015/0324632 | A1* | 11/2015 | Whitehill ............. G06K 9/6292 382/159 |
| 2015/0347822 | A1* | 12/2015 | Zhou ................. G06K 9/00248 382/118 |
| 2017/0262962 | A1* | 9/2017 | Rad ....................... G06T 3/4046 |
| 2018/0012092 | A1* | 1/2018 | Gleeson-May .... G06K 9/00281 |
| 2018/0158246 | A1* | 6/2018 | Grau .................. G02B 27/0093 |
| 2018/0300880 | A1* | 10/2018 | Fan ............................ G06T 7/11 |
| 2019/0014884 | A1* | 1/2019 | Fu ......................... G06K 9/00671 |
| 2019/0026538 | A1* | 1/2019 | Wang ................. G06K 9/00261 |
| 2019/0138787 | A1* | 5/2019 | Zhang ................. G06K 9/6274 |
| 2019/0147224 | A1* | 5/2019 | Li ........................ G06K 9/4609 382/103 |
| 2019/0206056 | A1* | 7/2019 | Georgescu ............. G06N 7/005 |
| 2019/0279009 | A1* | 9/2019 | Srirangam Narashiman ............... G06K 9/2018 |
| 2020/0202854 | A1* | 6/2020 | Lu ........................... G10L 15/30 |

OTHER PUBLICATIONS

Chen, et al., "Mode-based Multi-Hypothesis Head Tracking Using Parametric Contours," In Proc. Autom. Face Gesture Recognit., 6 pages (May 2002).

Chrysos, et al., "A Comprehensive Performance Evaluation of Deformable Face Tracking In-the-Wild," Int. J Comput. Vis., 126: pp. 198-232 (2018).

Cootes, et al., "Active Appearance Models," Proc. European Conference on Computer Vision, vol. 2, pp. 484-498 (1998).

Dornaika, et al., "Fitting 3D Face Models for Tracking and Active Appearance Model Training," Image Vision Comput., vol. 24, pp. 1010-1024 (2006).

Felzenszwalb, et al., "Object Detection with Discriminatively Trained Part-Based Models," IEEE, vol. 32, No. 9, pp. 1627-1645 (Sep. 2010).

Freund, et al., "A Decision-Theoretic Generalization of On-line Learning and an Application to Boosting," Journal of Computer and System Sciences, No. 55, 35 pages (Dec. 1996).

Gao, et al., "A Review of Active Appearance Models," IEEE Trans. Syst. Man Cybern. C Appl. Rev., vol. 40, No. 2, pp. 145-158 (Mar. 2010).

Horn, et al., "Determining Optical Flow," Massachusetts Institute of Technology, Artificial Intelligence Laboratory, Memo No. 572, 28 pages (Apr. 1980).

Kingma, et al., "Adam: A Method for Stochastic Optimization," conference paper at ICLR 2015, 15 pages, available on Dec. 9, 2018 at https://arxiv.org/pdf/1412.6980.pdf.

Liao, et al., "Learning Multi-scale Block Local Binary Patterns for Face Recognition," Center for Biometrics and Security Research & National Laboratory of Pattern Recognition, Institute of Automation, Chinese Academy of Sciences, pp. 828-837 (2007).

Lin, et al., "Robust Face Detection with Multi-Class Boosting," 2005 IEEE Computer Society Conference on Computer Vision and Pattern Recognition, 8 pages, (2005).

Prabhu, et al., "Automatic Facial Landmark Tracking in Video Sequences using Kalman Filter Assisted Active Shape Models," ECCV '10 Proceedings of the $11^{th}$ European conference on Trends and Topics in Computer Vision—Volume Part I, 14 pages (2010).

Steger, et al., "Failure Detection for Facial Landmark Detectors," arXiv:1608.06451, Research Gate, 16 pages, (2016).

Viola, et al., "Robust Real-Time Face Detection," International Journal of Computer Vision, 57(2), pp. 137-154, (Jan. 10, 2004).

Viola, et al., "Robust Real-time Object Detection," $2^{nd}$ International Workshop on Statistical and Computational Theories of Vision—Modeling, Learning, Computing, and Sampling, 25 pages (Jul. 2001).

Yang, et al., "Stacked Hourglass Network for Robust Facial Landmark Localisation," In Proceedings of the International Conference on Computer Vision & Pattern Recognition (CVPRW), IEEE, pp. 79-87, (Jul. 2017).

Zhang, et al., "Joint Face Detection and Alignment using Multi-task Cascaded Convolutional Networks," IEEE Signal Processing Letters, 23(10), pp. 1499-1503 (2016).

\* cited by examiner

REAL-TIME TRACKING OF FACIAL FEATURES IN UNCONSTRAINED VIDEO

TECHNICAL FIELD

The present invention relates to a system and methods for the localization and tracking of facial features of an animal subject, and, more particularly, the real-time localization and tracking of facial features in unconstrained video sequences.

BACKGROUND ART

The localization of facial features within unconstrained video sequences is an important precursor to a range of applications, such as the simulation of make-up or character animations, expression or emotion classification, or biometric analysis for the purposes of identification or recognition. In this context, and those related, a "facial feature" is considered to be a trivially identifiable, semantically unique landmark on a human face, such as the inner left corner of the lips, the tip of the nose, or the center of the pupil of the right eye.

In order to achieve satisfactory performance and results, the potential applications referenced require the efficient and robust provision of facial feature locations, but the methods heretofore developed for delineating facial features within images typically require the images to have been captured under rather constrained conditions. These requirements may include restrictions on lighting intensity or limitations on the pose of the head of the individual depicted. Alternatively, existing methods may not be computationally efficient enough to be applied to real-time video localization problems, or deployed to hardware-limited, consumer-level mobile devices. U.S. Pat. No. 9,633,250 to Tuzel et al, entitled "Method for estimating locations of facial landmarks in an image of a face using globally aligned regression", for instance, describes a system whereby a prototype face shape is initially aligned to a face image in order to derive a set of global alignment parameters. These parameters would then be used to warp the landmarks and the underlying image, from which features are extracted and used by a regression function to ascertain updated landmark locations in the prototype space. Finally, these locations could be warped back to the image space in order to obtain final landmark locations. Not only would this system appear too heavy to be applied to real-time problems, it also seems to be implicitly dependent upon the provision of images already known to exhibit prominent frontal faces, rather than those given under unconstrained circumstances.

Many approaches to real-time facial feature tracking require the user to cooperate with the system in some way allowing the face to be acquired before the feature tracking can begin. Examples include asking the user to indicate where their face is in a live video stream using an input device such as a mouse or touch screen, asking the user to align their face with graphics overlaid on the video stream by moving the camera or the face, or simply requiring the user to face the camera. Not only is this required to initialize the feature tracking but also again after each time the tracking fails. All forms of enforced user cooperation are detrimental to the user experience and often give the impression to the user that the system has become broken, for example, if the application is facial augmented reality, on tracking failure, all rendering augmenting the face will need to cease until the user cooperates with the system allowing tracking and rendering to resume. This requirement breaks the illusion that the system is attempting to create, thereby reducing the effectiveness of the application.

Viola et al [2] and Felzenszwalb et al [3] both propose examples of real-time face detection. Like most detection methods, a bounding box for each detected face is returned and can be used to initialize a face tracker with an average neutral shaped face, facing the camera, positioned centrally in the detected box. This process often works well if the detected face is also facing the camera with a neutral expression, but as these assumptions break down, the tracker can fail, owing to being initialized too far away from the solution.

Zhang et al [1] teach a method of combining face detection and alignment in unconstrained environments using a cascade of three stages of deep convolutional networks. The first two stages propose and refine candidate faces in the image and the final stage is similar to the second stage but also returns five facial landmark positions. Frame-to-frame feature trackers generally need more than five landmarks to successfully initialize a search.

Yang et al [4] describe using a supervised face transform to remove shape variation by identifying and removing rigid transforms from the detected face, then a stacked Hourglass Network, based on a series of convolutional layers, is employed to identify a dense set of facial landmarks. Although results show accurate feature localization on unconstrained images, the complexity of the networks would make them impractical for use in real-time applications on a mobile device.

As well as being able to successfully reinitialize the feature tracking without user intervention, it is equally important to detect when the tracking has failed owing to tracking errors, occlusion of the user, or an out-of-frame position of the user. Failure to detect these conditions can result in rendering of augmented reality effects that are incorrectly aligned with the face, for example, in the case of makeup virtual try on, rendering lipstick on the teeth. Steger et al [6] describe a failure detection method that extracts a patch of 128×128 pixels plus a border of 48 pixels in each direction and extracts a combination of Sift, HoG and LBP features. After applying a dimensionality reduction using PCA, a 1500 element feature vector per feature category is obtained. Support vector regression is then used to predict landmark confidence from a feature vector. They report that the feature extraction alone takes 107 ms per image, which is far too slow for real-time applications, which must operate the entire pipeline, both tracking, failure detection and rendering, at 30 frames per second.

Were methods developed that allowed for efficient localization in unconstrained environments, applications such as those highlighted could be made far more accessible to a much broader range of potential end-users and user scenarios. Social scenarios or scenarios where the users is unaware or uncooperative with the tracking system can successfully be addressed only if the tracking system can achieve satisfactory performance on truly unconstrained video including various lighting conditions and extreme head poses.

SUMMARY OF THE EMBODIMENTS

In accordance with various embodiments of the present invention, a system and methods are provided that may be used for locating and tracking facial features in unconstrained video sequences for applications such as the synthesis of simulated make-up, the manipulation of the appearance of a computer-generated character model, or for the recognition and identification of individuals.

Aspects of various embodiments of the invention include, without limitation:

1. A feature-based face detector capable of delineating, by way of region-bounding coordinates, the face of an individual within an image, given unconstrained environment, lighting, camera characteristics, expression, and pose.
2. The detection of a small subset of landmarks using a lightweight convolutional neural network, trained to take as input an image region corresponding to the face of an individual and return a set of coordinates at speeds approximating real-time.
3. A process by which a three-dimensional character model is projectively fitted to the detected landmarks, in order for the physical locations of additional landmarks to be estimated, thereby deriving complete facial landmark sets ("hypotheses").
4. A feature tracker capable of updating generated hypotheses by estimating steps that will improve convergence between the predicted feature locations and their actual physical locations.
5. A method of evaluating facial feature hypotheses and objectively expressing confidence in them by way of score, which will allow for inaccurate hypotheses to be identified and discarded, potentially triggering the generation of a new hypothesis.

In one embodiment, the invention provides a computer implemented method for generating a set of feature locations characterizing a face of an animal subject from an unconstrained video sequence that constitutes a physical record of the face of the subject. The method is implemented using computer processes including: in a face-detecting process, delineating, by way of region-bounding coordinates, the face of the subject within an image selected from the sequence; detecting, in the selected image, a small set of landmarks, corresponding to the face of the subject, using a convolutional neural network, trained to take as input an image region corresponding to the face of the subject and to return a set of coordinates at computational speeds approximating real time; projectively fitting a three-dimensional character model to the detected landmarks, and using the fitted model to estimate physical locations of additional landmarks, so as to provide a complete hypothesized set of facial landmarks; and in a feature tracker process, updating the hypothesized set of facial landmarks to improve convergence between predicted feature locations and their actual physical locations based on data sampled from the selected image.

In a related embodiment, the computer processes further include in a calibration process, refining the three-dimensional character model so that it more closely matches a shape of a head of the subject. Alternatively or in addition, the computer processes further include training the convolutional neural network with images augmented with synthetic lighting. Also alternatively or in addition, the computer processes further include training the convolutional neural network with images augmented with changes to background. In yet another related embodiment, the computer processes further include training the convolutional neural network with images augmented with motion blur.

In another embodiment, there is provided a computer-implemented method of evaluating a facial feature hypothesis, associated with an image including a face. The method objectively evaluates confidence in the hypothesis and is implemented by computer processes including: a. extracting, from the image, a set of texture patches, each patch centered on a feature within the hypothesis and oriented and scaled with reference to the face; b. normalizing the patches; c. passing each one of the normalized patches through a confidence-scoring convolution neural network trained to predict a confidence score indicating an extent to which the feature to which such patch corresponds is correctly positioned; and d. combining the confidence scores for each of the facial features to give an overall confidence score for the hypothesis.

In a related embodiment, the computer processes further include using a lightweight convolutional neural network to estimate an approximate head pose associated with the facial feature hypothesis; and using the estimated head pose to select the confidence-scoring convolution neural network from a set of confidence-scoring convolution networks, each confidence-scoring convolution network in the set being associated with a distinct head pose range. Alternatively or in addition, the processes further include training the confidence-scoring convolutional neural network with images augmented with synthetic lighting. Also alternatively or in addition, the processes further include training the confidence-scoring convolutional neural network with images augmented with changes to background. Alternatively or in addition, the processes further include training the convolutional neural network with images augmented with motion blur.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The foregoing features of embodiments will be more readily understood by reference to the following detailed description, taken with reference to the accompanying drawings, in which:

FIG. 8A depicts an example of the distribution of face region sampling points, FIG. 8B depicts the image sample generated by applying bilinear interpolation at given sampling points, and FIG. 8C depicts the result of applying zero-mean and unit-standard deviation normalization to the sample.

FIG. 14A depicts the landmarks that have been detected in the context of the normalized sample and FIG. 14B depicts the detected landmarks in the context of the original image.

DETAILED DESCRIPTION OF SPECIFIC EMBODIMENTS

Definitions. As used in this description and the accompanying claims, the following terms shall have the meanings indicated, unless the context otherwise requires:

A "set" includes at least one member.

The term "image" refers to any multidimensional representation, whether in tangible or otherwise perceptible form or otherwise, of an object, whereby a value of some characteristic is associated with each of a plurality of locations corresponding to dimensional coordinates of the object in physical space, though not necessarily mapped one-to-one thereonto. Thus, for example, the graphic display of the spatial distribution of some feature, such as temperature, in one or more colors constitutes an image. So, also, does an array of numbers, in a computer memory or holographic medium, corresponding to dimensional coordinates of the object.

Similarly, "imaging" refers to the rendering of a stated physical characteristic in terms of one or more images.

A "computer process" is the performance of a described function in a computer using computer hardware (such as a processor, field-programmable gate array or other electronic combinatorial logic, or similar device), which may be operating under control of software or firmware or a combination of any of these or operating outside control of any of the foregoing. All or part of the described function may be performed by active or passive electronic components, such as transistors or resistors. In using the term "computer process" we do not necessarily require a schedulable entity, or operation of a computer program or a part thereof, although, in some embodiments, a computer process may be implemented by such a schedulable entity, or operation of a computer program or a part thereof. Furthermore, unless the context otherwise requires, a "process" may be implemented using more than one processor or more than one (single- or multi-processor) computer.

An "animal subject" is a particular instance of a vertebrate selected from the group consisting of humans, non-human mammals, birds, reptiles, and amphibians.

An "unconstrained" video sequence that constitutes a physical record of the face of an animal subject is a sequence having no constraints on environment, lighting, facial expression, and pose of the subject, nor on characteristics of the camera giving rise to the sequence.

A "small set of landmarks" corresponding to the face of a subject is at least two and fewer than ten landmarks corresponding thereto.

Figure 1:
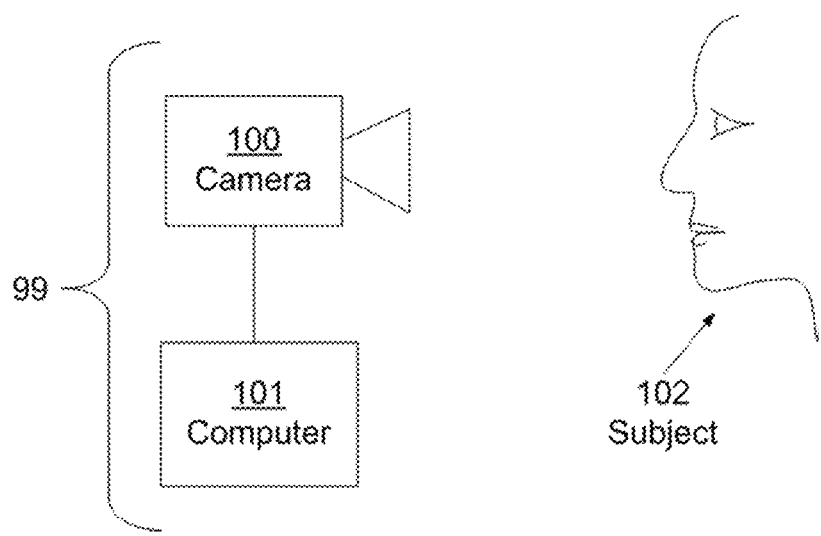
FIG. 1 schematically depicts the basic components of a facial feature tracking system, in accordance with embodiments of the present invention.

FIG. 1 schematically depicts the basic components of a facial feature tracking system 99, in accordance with embodiments of the present invention. A monocular video camera 100 is positioned to capture the face of a subject 102 during a performance, and a computational device 101 contains a central processing unit and memory. The memory is capable of storing all of the entities and data of the system. The memory also contains a program in the form of a series of instructions which, when executed by the central processing unit, and applied to the data and entities, track the location of the facial features in the images captured by the camera. The system 99 is configured so that the video of the performance of the subject 102 is captured by the camera 100 and streamed to the computational device 101 for processing and generation of the facial feature locations in realtime.

Real-Time Facial Feature Tracking in Unconstrained Video

Figure 2:
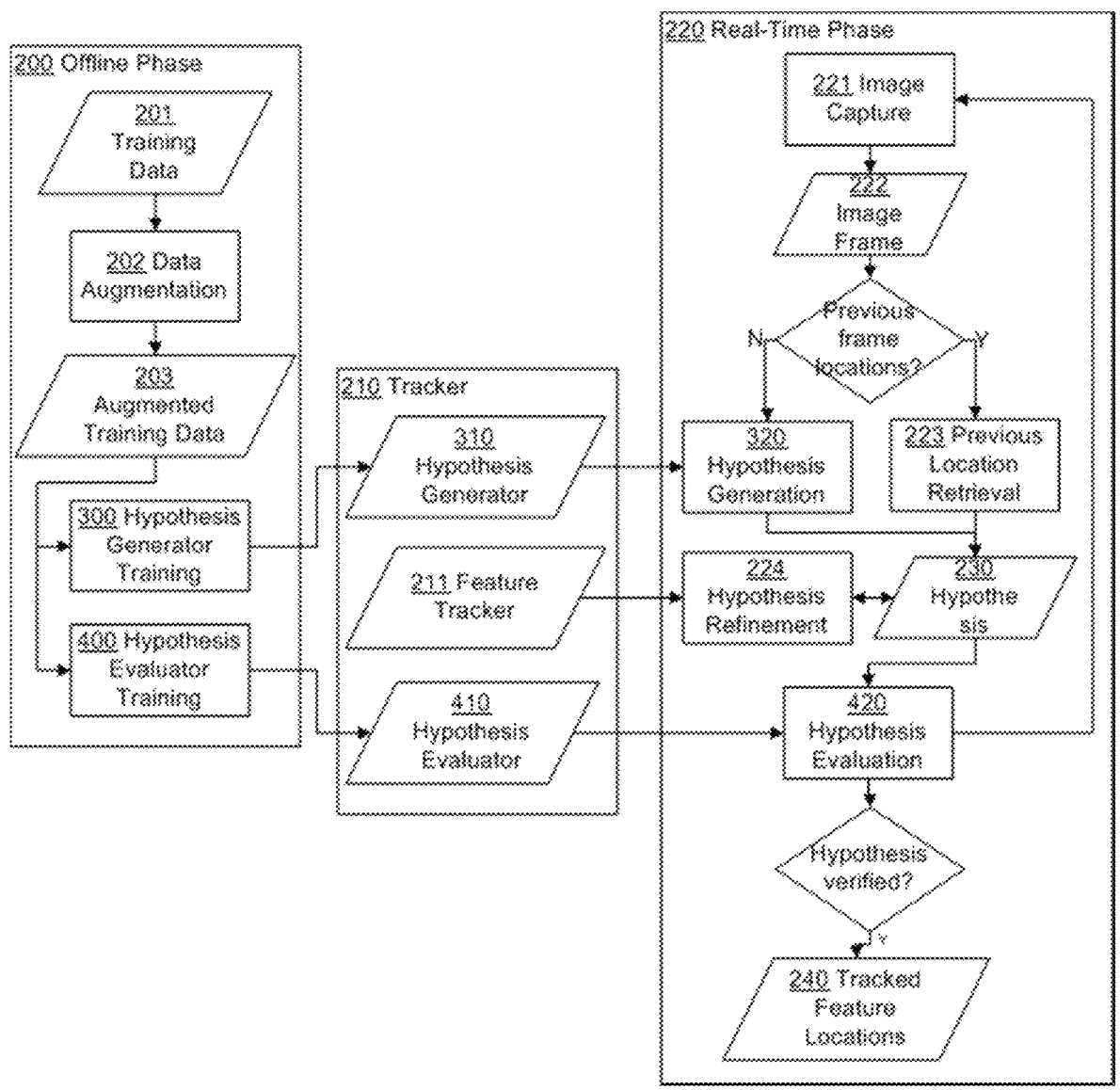
FIG. 2 is a flowchart depicting an overview of the offline and online phases of the system, in accordance with embodiments of the present invention.

FIG. 2 is a flowchart depicting an overview of the offline phase 200 and real-time phase 220 of the system 99, in accordance with embodiments of the present invention. Methods for generating facial feature (or "landmark") locations from unconstrained image sequences depicting the performance of the subject 102 of FIG. 1, as captured by the camera 100 of FIG. 1, are now described with reference to the flowchart depicted in FIG. 2. The Offline Phase 200 involves the training and construction of the Tracker 210. The Real-Time Phase 220 uses the Tracker 210 to generate the Tracked Feature Locations 240. The Offline Phase 200 is executed prior to the Real-Time Phase 220, but need not be executed on the same computational unit, since its generated output, the Tracker 210, may be stored on digital memory and transferred to other computational units. Once constructed, the Tracker 210 may be used for any number of Real-Time Phase 220 executions.

The Offline Phase 200, described in detail below, entails Data Augmentation process 202 as well as Hypothesis Generator Training 300 and Hypothesis Evaluator Training 400, the products of which are, respectively, the Hypothesis Generator 310 and Hypothesis Evaluator 410 components of the Tracker 210.

During the Real-Time Phase 220, the Tracker 210 attempts to produce a set of Tracked Feature Locations 240 for each Image Frame 222 provided from a captured video sequence. For each given Image Frame 222, a Hypothesis 230 (a prediction of facial feature locations) will either be generated by the Hypothesis Generator 310 through Hypothesis Generation 320 or ascertained through Previous Location Retrieval 223, depending on availability. The given Hypothesis 230 will then be refined by the Feature Tracker 211 through Hypothesis Refinement process 224. The updated Hypothesis 230 then requires evaluation, so will be verified by the Hypothesis Evaluator 410 during Hypothesis Evaluation process 420. If successful, the Hypothesis 230 will be deemed an accurate set of Tracked Feature Locations 240 for the given Image Frame 222. Tracked Feature Locations 240 that have been created for sequential video frames can be further processed in real time, for applications such as digital character animation.

Offline Phase: Creating the Tracker

Figure 3:
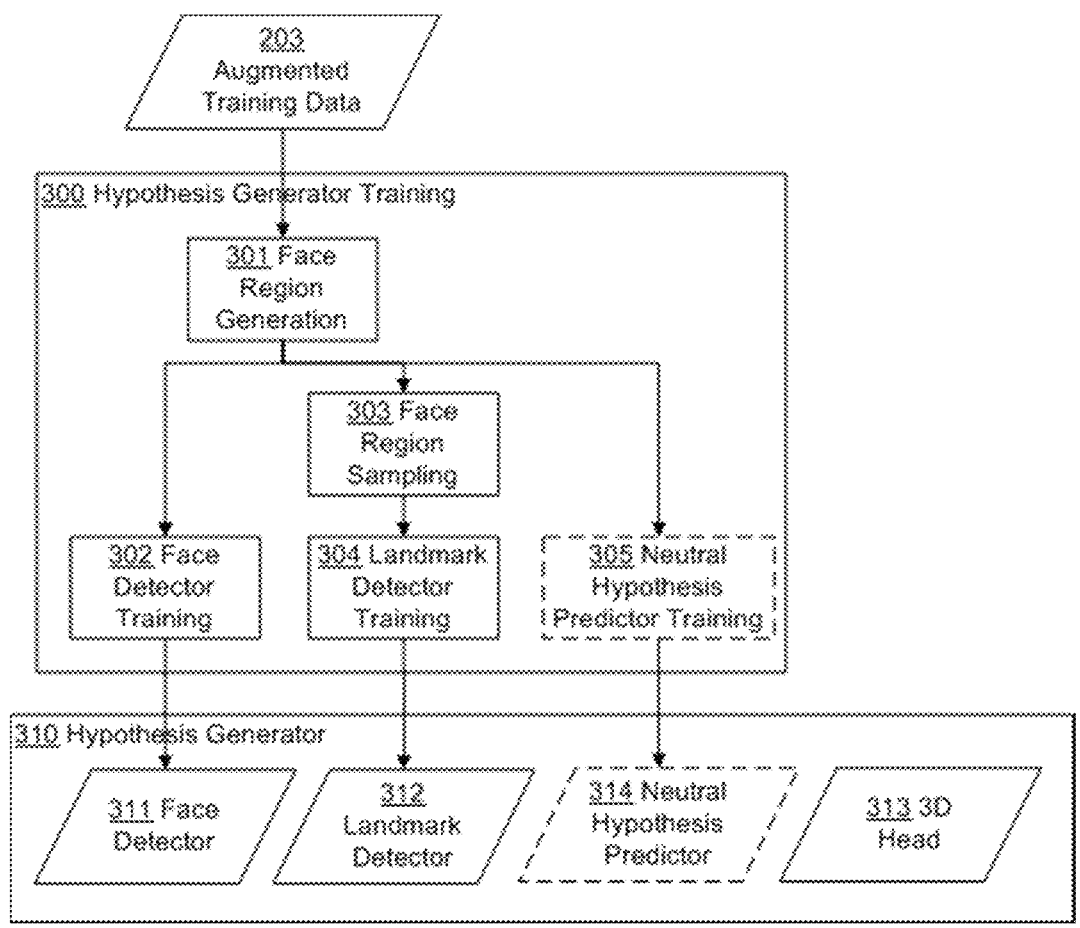
FIG. 3 is a flowchart depicting the process of creating the constituent components of the hypothesis generator, in accordance with embodiments of the present invention.
Figure 4:
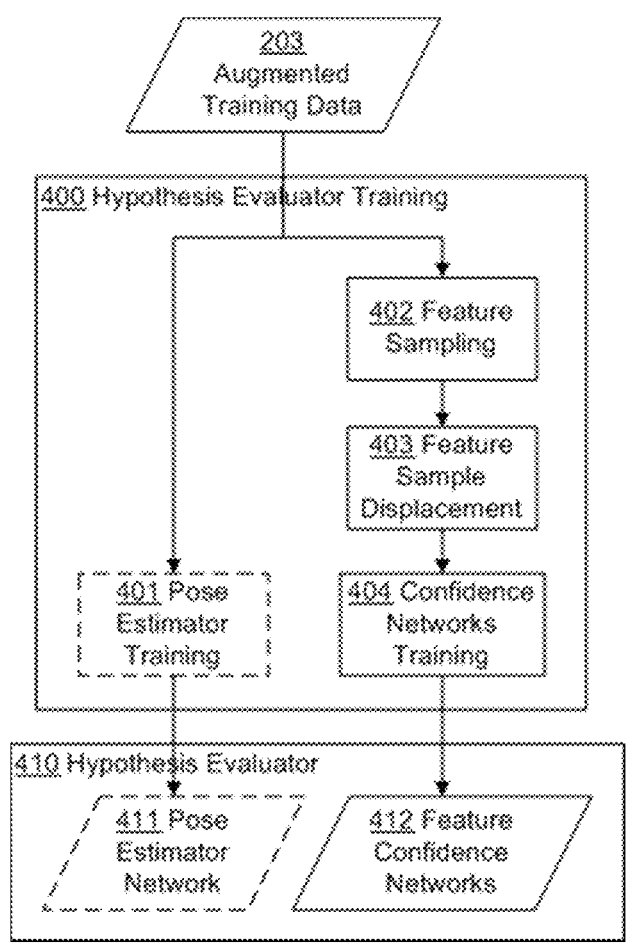
FIG. 4 is a flowchart depicting the process of creating the constituent components of the hypothesis evaluator, in accordance with embodiments of the present invention.

Methods for creating a Tracker 210 capable of producing a set of Tracked Feature Locations 240 given an Image Frame 222, or a sequence of them, are now described with additional reference to FIG. 3 and FIG. 4. FIG. 3 is a flowchart depicting the process of creating the constituent components of the hypothesis generator (item 310 of FIG. 2), in accordance with embodiments of the present invention. FIG. 4 is a flowchart depicting the process of creating the constituent components of the hypothesis evaluator (item 410 of FIG. 2), in accordance with embodiments of the present invention.

The processes of FIGS. 3 and 4 are performed during execution of the Offline Phase 200 of FIG. 2. In FIG. 3, it can be seen that Hypothesis Generator Training process 300 produces the Face Detector 311 and Landmark Detector 312 components of the Hypothesis Generator 310. Similarly, in FIG. 4, it can be seen that Hypothesis Evaluator Training process 400 creates the Pose Estimator Network 411 and Feature Confidence Networks 412 that constitute the Hypothesis Evaluator 410. The Hypothesis Generator 310 and Hypothesis Evaluator 410 created during the Offline Phase 200 are combined with a Feature Tracker 211 to form Tracker 210, which is capable of delineating facial features in unconstrained video during the Real-Time Phase 220.

We now describe the creation of the Hypothesis Generator 310 and Hypothesis Evaluator 410 components of the Tracker 210 through Hypothesis Generator Training 300 (in FIG. 3) and Hypothesis Evaluator Training 400 (in FIG. 4), respectively.

In FIG. 2, the Feature Tracker 211, which completes the Tracker 210, contains an update model that can be applied to a Hypothesis 230, whether it has been yielded by Hypothesis Generation process 320 or Previous Location Retrieval process 223, during Hypothesis Refinement process 224. This refinement process will update the predicted feature locations with reference to the given Image Frame 222, allowing for features to be tracked from one frame to the next. Systems that may be used as a Feature Tracker 211 within the scope of the present invention include, but are not limited to, those described by Rogers et al. in "Building systems for adaptive tracking of facial features across individuals and groups," U.S. Pat. No. 9,104,908, which is hereby incorporated herein by reference in its entirety as our "Prior Patent."

Training Data Augmentation

As described in further detail below, training certain components of the system, such as the Face Detector 311 and the Landmark Detector 312, use machine learning techniques such as boosting and gradient descent optimization. To achieve optimal performance from these techniques, a large amount of training data, representing all the different forms of variation that are expected in unconstrained video, is required.

Initial Training Data 201 includes a large number of images of people with their facial feature locations manually annotated, but these data alone are not fully representative of the variation of expected inputs. Therefore, Data Augmentation process 202 is employed. This process entails the expansion of the original Training Data 201, by introducing modifications of the training samples included in the Initial Training Data 201. These modifications are intended to capture the variability expected during the Real-Time Phase 220, and are the result of a number of separate processes, including:

Lighting augmentation. For each image, the 3D geometry of the face (either measured or estimated) is used with rendering software to simulate different lighting conditions. Different lighting directions, intensities, and color temperatures can be simulated in this manner.

Background augmentation. Different backgrounds can be simulated for each image by creating a mask that separates image background from the face. A new background can be added to a training image by replacing all background pixels with pixels from a different image representing the new background.

Expression augmentation. The facial expression depicted by an image can be modified using the annotated feature locations as control points to a warp that modifies the face's shape. This method can be used to create underrepresented expressions, such as eyes closed or winking.

Identity augmentation. Much can be done to modify the identity of the person in the image. Image compositing can add glasses or facial hair. Color transforms can modify the skin tone of the person. Image warps can also be used to change the shape of the persons face.

Motion Blur augmentation. In unconstrained video, often the subject can be moving rapidly producing visible motion blur in the image. This motion blur might not be present in training data so it can be simulated by applying a blur filter.

These techniques can be used in isolation or applied to the samples of the Training Data 201 in combination with one another, as needs dictate. The result of Data Augmentation process 202 in FIG. 2 is Augmented Training Data 203, which will be used, per FIG. 2, during both Hypothesis Generator Training 300 and Hypothesis Evaluator Training 400.

Hypothesis Generator Training

Given circumstances, in FIG. 2, under which a facial feature Hypothesis 230 cannot be ascertained through Previous Location Retrieval 223 (perhaps the Hypothesis 230 for the previous Image Frame 222 was rejected by Hypothesis Evaluation 420, or the Image Frame 222 being processed is the very first of the given sequence), one must be created through Hypothesis Generation 320. This multi-stage process utilizes the Hypothesis Generator 310 to create a new Hypothesis 230 for the given Image Frame 222.

Figure 5:
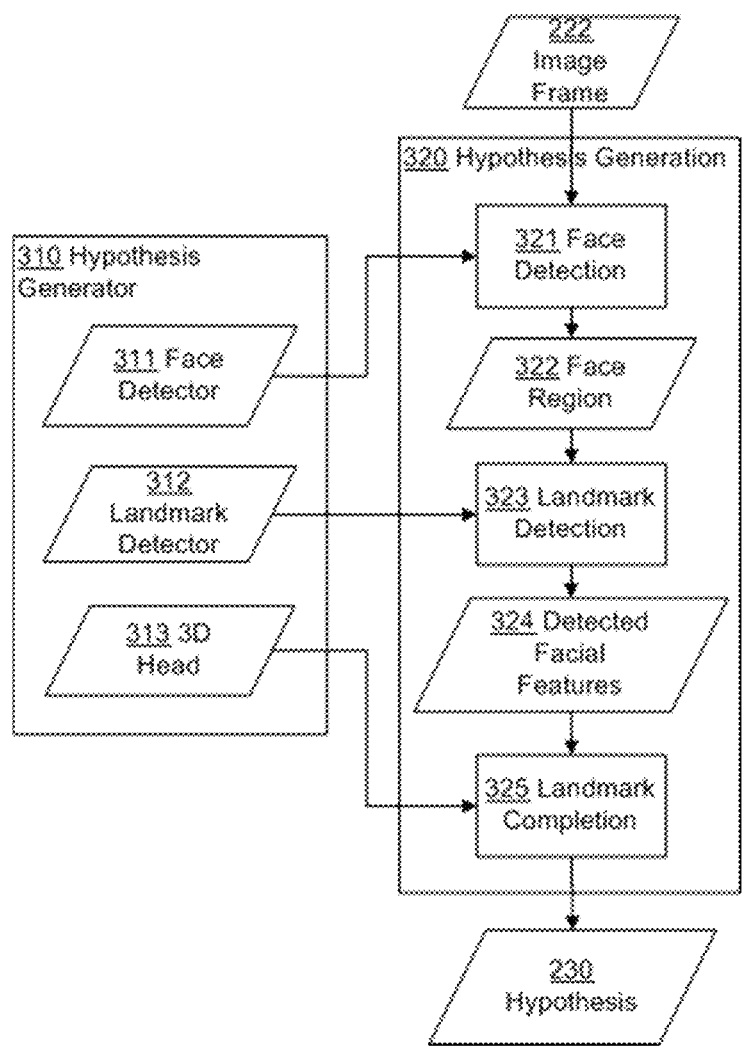
FIG. 5 is a flowchart depicting the process of generating a hypothesis using a hypothesis generator, in accordance with embodiments of the present invention.

As shown in FIG. 3, the Hypothesis Generator 310 has four separate components: a Face Detector 311, a Landmark Detector 312, an optional Neutral Hypothesis Predictor 314, and a 3D Head 313. As shown in FIG. 5, during execution of the Hypothesis Generation process 320, these components are utilized sequentially. First, the Face Detector 311 delineates the face of the individual depicted by the given Image Frame 222. This image region will then be sampled and provided to the Landmark Detector 312, which yields a small set of detected facial feature locations. The 3D Head 313, which may have been "calibrated" through utilization of the Neutral Hypothesis Predictor 314, provides a three-dimensional coordinate distribution describing the relative locations of the facial features of an average person. This distribution is then fitted to the detected features, to produce a complete feature Hypothesis 230.

As shown in FIG. 3, the Face Detector 311 and Landmark Detector 312 used by the Hypothesis Generator 310 are created through the Hypothesis Generator Training process 300, and are trained specifically to be capable of yielding accurate results given unconstrained inputs. The training is achieved through the provision of training samples that represent the large variability expected of future inputs, in terms of environmental factors, such as lighting and background appearance, and subject-centric factors, such as pose and expression. The Augmented Training Data 203 contain sufficient samples to meet these criteria, whether by manual annotation of images that resulted in the original Training Data 201 or by supplementing those samples through Data Augmentation process 202.

The Neutral Hypothesis Predictor 314 of FIG. 3 is an optional module that enables facial expression variation to be removed from a set of feature locations, which can reliably improve the accuracy of the Hypothesis Generation process 320 of FIG. 5. The creation of the Neutral Hypothesis Predictor 314 is achieved by the Neutral Hypothesis Predictor Training process 305 of FIG. 3.

The methods used to create the Face Detector 311, Landmark Detector 212, and Neutral Hypothesis Predictor 314 through Hypothesis Generator Training 300, shown in FIG. 3, are now described in detail. The 3D Head 313 data, which complete the Hypothesis Generator 310, are assumed to pre-exist, as their creation, either by manual methods or by machine learning techniques, is relatively trivial.

Face Region Generation

Before the training of either the Face Detector 311 or Landmark Detector 312 can begin, the faces depicted by the samples within the Augmented Training Data 203 must be delineated. While the Augmented Training Data 203 contain manually annotated facial feature locations, such information is insufficient for the training of components intended to locate and specifically work within face regions.

Therefore, the first process of Hypothesis Generator Training 300 of FIG. 3 is Face Region Generation process 301, which entails the derivation of face regions from the annotated feature locations within the Augmented Training Data 203. Each face region is then used later in the training process to define where to extract an image patch of a fixed resolution and aspect ratio representing the face. Once normalized, these image patches can then be used directly by the learning algorithms.

Figure 7:
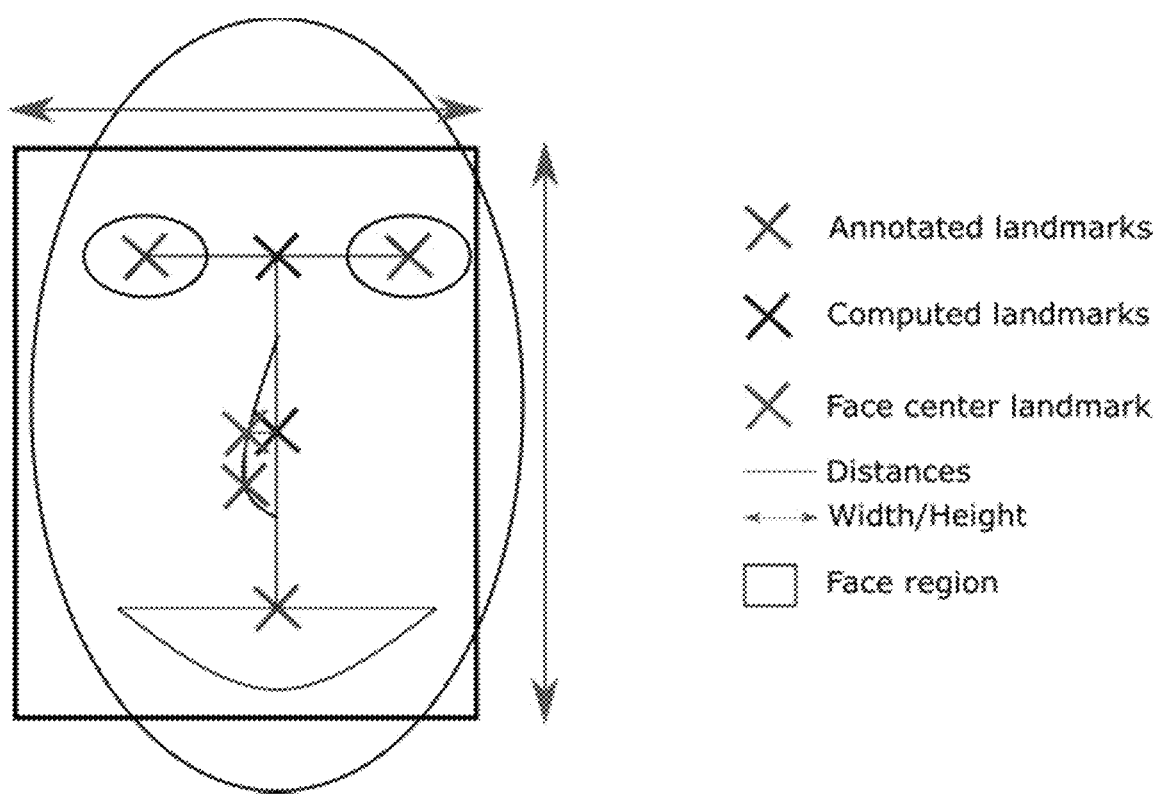
FIG. 7 is a sketch depicting a method for the generation of face region of an individual from annotated facial landmarks, in accordance with embodiments of the present invention.

A method to generate a face region of an individual from a set of annotated facial landmarks, in accordance with embodiments of the present invention, is illustrated by FIG. 7. A face region is a fixed aspect ratio box designed to be positioned consistently over a face despite possible variations of head pose and face expression. The set of landmarks used to generate the region is as minimal as possible, only 4 landmarks are required (the left and right eye centers (indicated by red x's in the eye), the nose tip (indicated by a red "x" in the nose area), and the mouth lip outer top middle (indicated by a red "x" in the mouth). From these 4 face landmarks, a face center point (centerFace, indicated by the green "x" in the diagram) is computed that is robust to the head pose and the face expression. Two intermediate points are computed before obtaining the centerFace, namely, the center of the eyes (centerEyes, indicated by the blue "x" between the two red x's) using Eq. 1, and a middle point (middlePoint, indicated by the blue "x" near the nose) between the lip center (middleLip) and the center of the eyes (centerEyes) using Eq. 2. Finally the face center is obtained by combining these two intermediate points using Eq. 3 and Eq. 4.

$$\text{centerEyes} = (\text{leftEye} + \text{rightEye})/2 \qquad (1)$$

$$\text{middlePoint} = (\text{centerEyes} + \text{middleLip})/2 \qquad (2)$$

$$\delta = \text{middlePoint}_x - \text{noseTip}_x \qquad (3)$$

$$\text{centerFace} = (\text{middlePoint}_x + \delta, \text{middlePoint}_y) \qquad (4)$$

The face region size is determined using either the largest distance between the eyes, $\text{distance}_{eyes}$, or the distance between the eyes center and the lip landmark, $\text{distance}_{eyesMouth}$. Switching between these two distances ensures the face region to be robust to various head orientation. The following formulas (Eqs. 5-8) are applied to obtain the face region size:

$$\text{if } \frac{\text{distance}_{eyes}}{\text{distance}_{eyesMouth}} \geq \text{ratio}_{distances}$$

$$\text{width} = \max(\text{distance}_{eyes}, \text{distance}_{eyesMouth}) * \text{scaleWidth}_{eyes} \qquad (5)$$

$$\text{height} = \max(\text{distance}_{eyes}, \text{distance}_{eyesMouth}) * \text{scaleHeight}_{eyes} \qquad (6)$$

else $$\text{width} = \max(\text{distance}_{eyes}, \text{distance}_{eyesMouth}) * \text{scaleWidth}_{eyesMouth} \qquad (7)$$

$$\text{height} = \max(\text{distance}_{eyes}, \text{distance}_{eyesMouth}) * \text{scaleHeight}_{eyesMouth} \qquad (8)$$

Where the scaling factors ($\text{scaleWidth}_{eyes}$, $\text{scaleHeight}_{eyes}$, $\text{scaleWidth}_{eyeMouth}$, and $\text{scaleHeight}_{eyesMouth}$) are derived from annotated bounding box data, to maintain an appropriate bounding box aspect ratio and consistent bounding box size, when approaching the boundary represented by $\text{ratio}_{distances}$.

Face Region Generation process 301 in FIG. 3 performs these calculations on the entirety of the Augmented Training Data 203.

Face Detector Training

In order to commence the tracking of facial features in a video sequence, a face must first be detected, so the first component of the Hypothesis Generator 310 leveraged during Hypothesis Generation 320 is the Face Detector 311. Many face detections systems exist, such as those described by Liao, et al. in "Learning Multi-scale Block Local Binary Patterns for Face Recognition," International Conference on Biometrics (ICB), LNCS 4642, pp. 828-837 (2007), but many fail to detect faces on a consistent basis in unconstrained video, wherein the faces of depicted individuals are not necessarily oriented directly towards the camera.

The Face Detector 311 created by the Face Detector Training 302 stage of Hypothesis Generator Training 300 is a boosted cascade classifier, similar to that proposed by Viola-Jones [2], but using local binary pattern (LBP) features, although other face detection methodologies, such as those proposed by Lin [8], could be applied in alternative embodiments on the present invention.

The boosted training process for a cascade classifier requires images that have been manually annotated as positive and negative, and these are provided by the Augmented Training Data 203. The negative sample set used during training includes image patches derived from images containing no faces, like those used as background examples during Data Augmentation 202. With respect to standard Viola-Jones face detectors, it is ensured that the positive training set contains a wide range of head poses (0 degree (frontal) to ±60 degrees (profile)), expressions, identities, and lighting conditions. The previously described Face Region Generation process 301 is applied to the positive images of the training set. The combination of the variety of samples in the positive training image set and the Face Region Generation 301 process, which provides consistent face regions regardless of the pose and expression of the individuals depicted, ensures the robustness of the resultant Face Detector 311 to these phenomena during usage.

Training the Landmark Detector

The role of the Landmark Detector 312 component in the Hypothesis Generator 310 is to define the locations of a small set of facial features within a provided face region. Unlike the Face Detector 311, which can digest and function over arbitrarily sized images, the Landmark Detector 312 is designed to operate on inputs of a particular format. Therefore, the creation of the Landmark Detector 312 during Hypothesis Generator Training process 300, and similarly its run-time usage, require a preliminary Face Region Sampling process 303. The face regions provided by Face Region Generation process 301 undergo this processing, which transforms the given image regions from the Face Region Generation process 301 into the size and shape required by Landmark Detector Training process 304.

Face Region Sampling

Figure 8A:
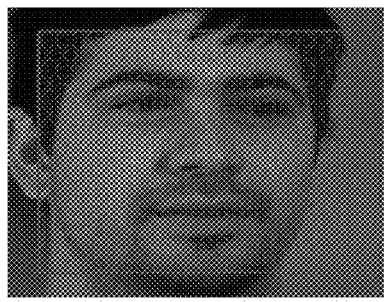
FIGS. 8A-8C illustrate the contiguous stages of image sampling, where
Figure 8B:
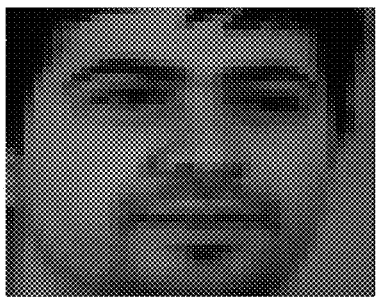
Figure 8C:
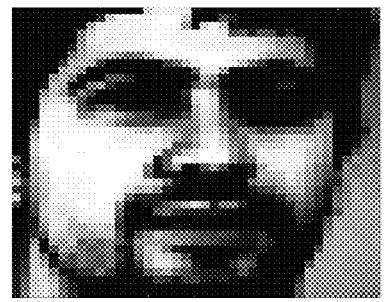

A face region, as provided by Face Region Generation 301, represents the bounds of a region in image space that contains a face. The region can be of any size that is no greater than the size of the original input image. However, the input data for most types of neural networks, including that encapsulated by a Landmark Detector 312, must be of a particular shape and size in order for it to be correctly processed. Therefore, Face Region Sampling process 303, which takes samples from a fixed number of uniformly distributed sub-pixel locations within the provided face region of the given image, regardless of its size, is adopted. An example of the distribution of such sampling points can be seen in FIG. 8A. FIGS. 8A-8C illustrate the contiguous stages of image sampling, where FIG. 8A depicts an example of the distribution of face region sampling points, FIG. 8B depicts the image sample generated by applying bilinear interpolation at given sampling points, and FIG. 8C depicts the result of applying zero-mean and unit-standard deviation normalization to the sample.

In carrying out image sampling, for each channel of the given input image, a corresponding sample channel S of width m and height n is created, each pixel $s_{i,j}$ of which expresses an intensity equal to the result of bilinear interpolation (or any other interpolation method well-known in the field) at sub-pixel location $(x_i, y_j)$ within the original image, where $i=\{1,2,\ldots m\}$, $j=\{1,2,\ldots n\}$, and $x_i$ and $y_j$ are given, respectively, by Eq. 9 and Eq. 10.

$$x_i = x_0 + (w/m)/2 + (i-1)(w/m) \tag{9}$$

$$y_j = y_0 + (h/n)/2 + (j-1)(h/n) \tag{10}$$

Here, $x_0$ and $y_0$ represent, respectively, the x and y coordinates of the corner of the given face region closest in Euclidean space to the origin of the image to which it pertains, and w and h represent, respectively, the width and height, in pixels, of the face region in the original image space. The result of using bilinear interpolation to sample the locations depicted by FIG. 8A is given in FIG. 8B. Although bilinear interpolation is used in one embodiment of this invention, other interpolation methods, such as nearest-neighbor interpolation, could be used in alternative embodiments.

Generated samples are then normalized in order to negate potentially detrimental variable lighting conditions. For the purposes of creating the Landmark Detector 312, normalization of the image samples is achieved in a two-stage process. First, for each channel of the given sample, pixel intensity distributions are shifted such that the mean of each is equal to zero. Where $s_{i,j}$ represents the pixel of the sample channel S at location (i,j), and $i=\{1,2,\ldots m\}$, $j=\{1,2,\ldots n\}$, this transformation of the sample channel is given by Eq. 11.

$$s_{i,j}' = s_{i,j} - \underline{S} \tag{11}$$

Secondly, the channel distributions are scaled such that they express unit standard deviations. Where $\sigma_s$ represents the standard deviation of the pixel intensity distribution of a channel, this transformation given by Eq. 12.

$$s_{i,j}' = s_{i,j}/\sigma_s \tag{12}$$

The combined effect of these steps is a fully normalized image sample. For the purposes of demonstration, the result of normalizing the sample depicted by FIG. 8B is given in FIG. 8C.

During Hypothesis Generator Training process 300, the Face Region Sampling process 303 described above is applied to entire output of Face Region Generation process 301, which creates the training data required by Landmark Detector Training 304.

Training the Landmark Detector Network

Images within the Augmented Training Data 203 set that have been sampled through Face Region Sampling 303 will have accompanying facial feature location annotations. In order for the relationships between these feature locations and the image sample data provided by Face Region Sampling 303 to be learned during Landmark Detector Training 304, the annotations must be spatially transformed such that the physical locations of facial features that were known prior to sampling will still be known after sampling has taken place. It is the learning of the relationship between image data and feature locations that yields the potential for landmarks within unconstrained inputs to be located by the Landmark Detector 312 during usage.

The transformation of landmark coordinates (x, y) from zero-indexed image-space to zero-indexed sample-space can be described by Eq. 13 and Eq. 14.

$$x' = (x - x_0)/(w/m) \tag{13}$$

$$y' = (y - y_0)/(h/n) \tag{14}$$

Here, $x_0$ and $y_0$ represent, respectively, the x and y coordinates of the corner of the provided face region closest in Euclidean space to the image origin, and w and h represent, respectively, the width and height, in pixels, of the face region in the given image space.

Through these methods, neural network training data, which have a multitude of image samples and corresponding landmark coordinates, can be generated. A further step is taken, however, to normalize the computed coordinates to a [−0.5,0.5] interval. This is common practice within the field, as it improves the rate of convergence of neural network training processes when applied to regression problems. This coordinate normalization step can be described by Eq. 15 and Eq. 16.

$$x' = (x/m) - 0.5 \tag{15}$$

$$y' = (y/n) - 0.5 \tag{16}$$

Figure 9:
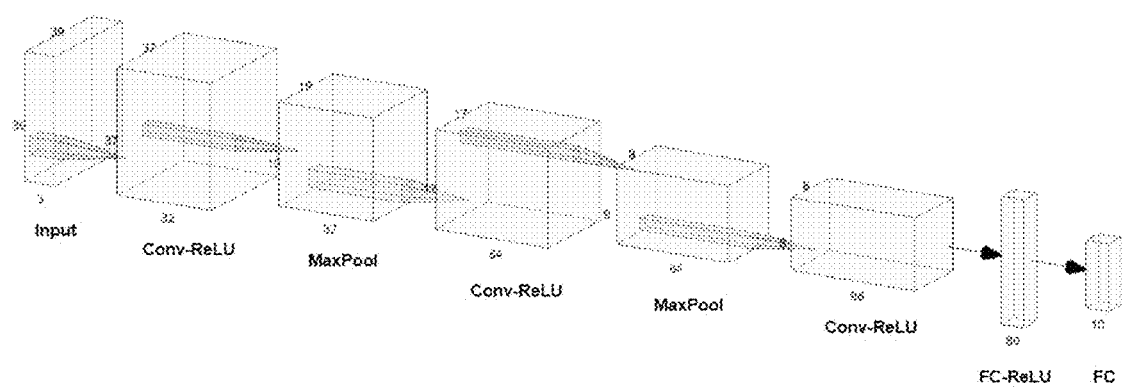
FIG. 9 depicts the architecture of the convolutional neural network used during landmark detection, in accordance with embodiments of the present invention.

In order to learn the non-linear relationship between image sample data and landmark coordinates, a convolutional neural network is employed. The particular architecture of the convolutional network employed by embodiments of the present invention is illustrated by FIG. 9. The input image is passed through a series of convolution, rectified linear unit (ReLU) and Max pooling layers before using two fully connected layers separated by a rectified linear unit to produce the final predicted normalized landmark x y coordinates as a 10 element vector. The network has been designed with efficiency, and the deployment of embodiments of the present invention on mobile devices, in mind, hence the utilization of pooling layers and shallow convolution layers. With this architecture, the number of parameters built into the network is minimized, reducing post-deployment throughput times as well as storage requirements. The outputs of the final fully-connected layer represent the predicted facial feature coordinates in normalized space.

Training of the network implemented by the Landmark Detector 312 is carried out through well-established, widely used means. Adaptive optimization approaches, such as Adam (see Kingma and Ba, "Adam: A Method for Stochastic Optimization," conference paper at ICLR 2015, available on Dec. 9, 2018) at https://arxiv.org/pdf/1412.6980.pdf) or more traditional gradient descent methods are applied to achieve convergence over training data. The completion of the Landmark Detector Training process 304 yields the trained Landmark Detector 312.

Neutral Hypothesis Predictor Training

The purpose of the Neutral Hypothesis Predictor 314 of FIG. 3 is to remove variation in feature location distribution due to head pose and facial expression from a set of feature locations, as given by a Hypothesis 230 (in FIG. 2) or a set of Tracked Feature Locations 240 (also in FIG. 2). The Neutral Hypothesis Predictor 314 produces a set of locations that describe the predicted facial feature distribution of the given user under a condition in which the given user would have been facing directly towards the camera with a neutral expression.

In order to arrive at the Neutral Hypothesis Predictor 314, the Neutral Hypothesis Predictor Training process 305 entails, at the outset, the creation of pairs of feature location distributions, derived from the Augmented Training Data 203. Each pair consist of a distribution of features that represents the face of an individual with expression and one that represents the face of the same individual without expression. It is the transformation of an arbitrary distribution representing expression to one that does not that is to be learned by the Neutral Hypothesis Predictor 314. Pairs that include the same expression-devoid feature distribution twice are also included, in order for the Neutral Hypothesis Predictor 314 to also learn that expression-devoid distributions should not be transformed to any significant degree.

Figure 17:
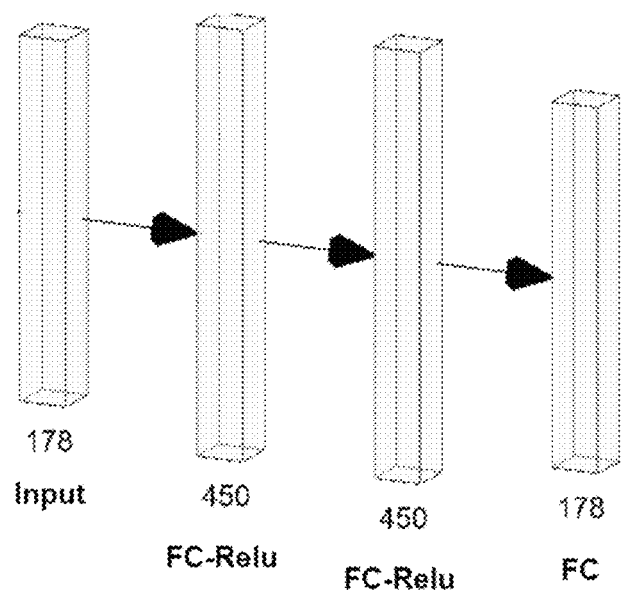
FIG. 17 depicts the architecture of the neural network implemented by the neutral hypothesis predictor, in accordance with embodiments of the present invention.

A pure fully connected neural network is employed to learn the transformation process from expression distribution to neutral distribution, and the particular architecture of the network implemented by the Neutral Hypothesis Predictor 314, in accordance with an embodiment of the present invention, is illustrated in FIG. 17. In order to simplify the problem, all training samples are normalized by aligning their constituent feature locations with a reference mean location distribution, derived from the Augmented Training Data 203, which expresses locations within a [−0.5,0.5] space. The input to the network is a vector including the concatenated x and y coordinates of the normalized feature locations. FIG. 17 depicts an input vector size of 178, representing the locations of 89 facial features used within one embodiment of the present invention, although other sets of locations can be selected within other embodiments. FIG. 17 also depicts the output of the final fully connected layer as a vector of size 178, which represents the locations of the given features after transformation from the expression distribution to the neutral distribution. The internal layers of the architecture comprise of two fully connected layers, each followed by a rectified linear unit layer. The dimensionality of the fully connected layers output was chosen, by experimentation, to be 450.

The training of the network is carried out using conventional methodologies, and the output of Neutral Hypothesis Predictor Training process 305 is the trained Neutral Hypothesis Predictor 314 component of the Hypothesis Generator 310.

Hypothesis Evaluator Training

The aim of the Hypothesis Evaluator 410 of FIG. 4 is to verify the accuracy of a given Hypothesis 230 during Hypothesis Evaluation process 420, whereby successful verification will yield a set of Tracked Feature Locations 240 for the given Image Frame 222.

The Hypothesis Evaluator Training process 400, described in detail below, entails the creation of the Feature Confidence Networks 412 and, optionally, the Pose Estimator Network 411 components of the Hypothesis Evaluator 410. The Feature Confidence Networks 412 can operate under different modes during Hypothesis Evaluation 420, depending upon the pose represented by the given Hypothesis 230. The pose classification can in one embodiment potentially be provided by the adopted Feature Tracker 211, but can instead be provided, in another embodiment, by a dedicated Pose Estimator Network 411, if required. Its creation during the Offline Phase 200 and usage during the Real-Time Phase 220 are considered optional for this reason.

Pose Estimator Training

The Pose Estimator Network 411 component of the Hypothesis Evaluator 410 implements a convolutional neural network that can digest an image sample depicting the face of an individual and return a classification for the pose of the head of the individual. This classification is in the form of a semantic label, which, in one embodiment, can take one of three discrete values: "frontal", "left", or "right", although other combinations of semantic labels are also included in various embodiments of the current invention. If deployed, the particular classification returned by the Pose Estimator Network 411 will determine how the Feature Confidence Networks 412 calculate confidence for a given Hypothesis 230.

The samples used to train the Pose Estimator Network 411 during Pose Estimator Training 401 are derived from the Augmented Training Data 203. In addition, although the Pose Estimator Network 411 is similar to the Landmark Detector 312 in that they both take image samples that, under normal circumstances, depict faces, the training samples used during the creation of the Pose Estimator Network 411 are also augmented with random displacements.

FIG. 5 is a flowchart depicting the process of generating a hypothesis using a hypothesis generator, in accordance with embodiments of the present invention. As seen in FIG. 5, the pipeline of the Hypothesis Generation process 320 dictates that the Landmark Detection process 323 will always be preceded by Face Detection process 321 for any given Image Frame 222 where it is to be applied, which ensures that the face regions provided to the Landmark Detector 312 will always be available and up-to-date. This is not the case where the Pose Estimator Network 411 is concerned, however, which may be used during the processing of an Image Frame 222 for which Face Detection process 323 has not occurred. This would be the situation if the given Hypothesis 230 to be evaluated during Hypothesis Evaluation process 420 has been provided by Previous Location Retrieval process 223 rather than Hypothesis Generation process 320.

Therefore, rather than being provided by the Face Detector process 311, the face regions used by the Pose Estimator Network 411 are bounding boxes that encapsulate the locations expressed by the given Hypothesis 230. The derivation of these boxes is simpler than the procedure undertaken during Face Region Generation process 301, as the greater number of feature locations made available by a Hypothesis 230 renders the extrapolative nature of that process unnecessary.

Although the locations expressed by the given Hypothesis 230 will have been refined using the Feature Tracker 211 during Hypothesis Refinement 224, there may have been significant movement of the features between consecutive Image Frame 222 captures, so even updated locations may no longer be accurate enough to give consistent face regions if they are based upon Tracked Feature Locations 240 from a preceding Image Frame 222. The addition of random displacements to the data provided to the Pose Estimator Training process 401 is intended to capture and account for this variability.

Figure 10:
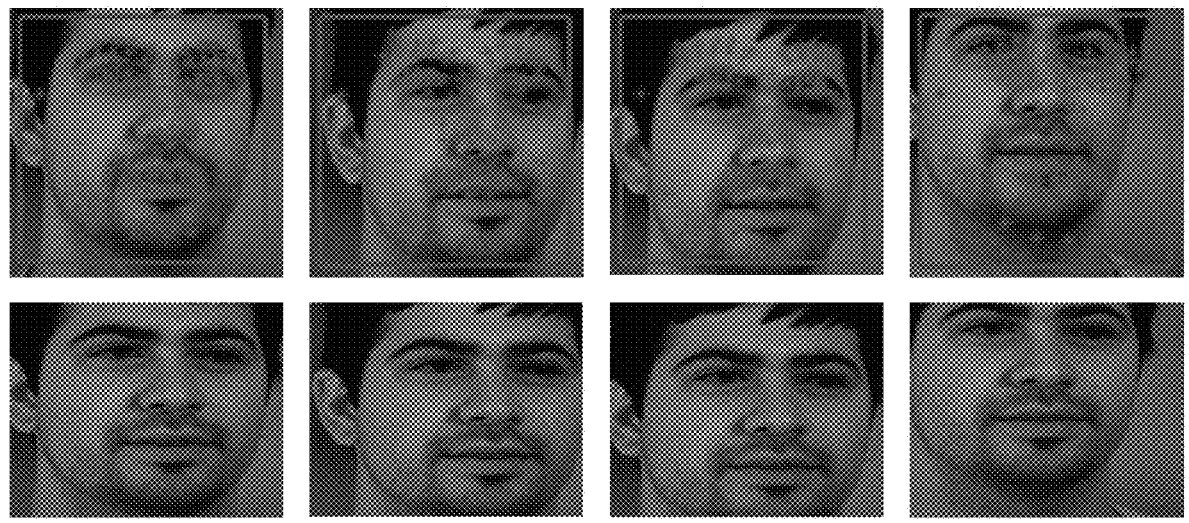
FIG. 10 depicts examples of the feature location displacements applied to the training data of the pose estimator.

These random displacements take the form of small, randomly computed offsets, to be applied to the annotated feature locations of the Augmented Training Data 203. By displacing the locations by small amounts, the derived bounding boxes will also be displaced to a certain degree, as shown by FIG. 10, depicts examples of the feature location displacements applied to the training data of the pose estimator, in accordance with an embodiment of the present invention. The location displacements ensure that the data provided to the Pose Estimator Training 401 process expresses the inconsistency of the regions, with regard to relative facial feature positions, that is likely to be manifested during execution of the Real-Time Phase 220, and therefore to greatly improve the robustness of the Pose Estimator Network 411.

The methods used to sample the face regions, as defined by the computed bounding boxes, are those previously described for the Face Region Sampling process 303, as used prior to Landmark Detector Training process 304. Furthermore, the Augmented Training Data 203 is divided manually into three categories, one for each of the classification labels to be returned by the Pose Estimator Network 411.

Figure 11:
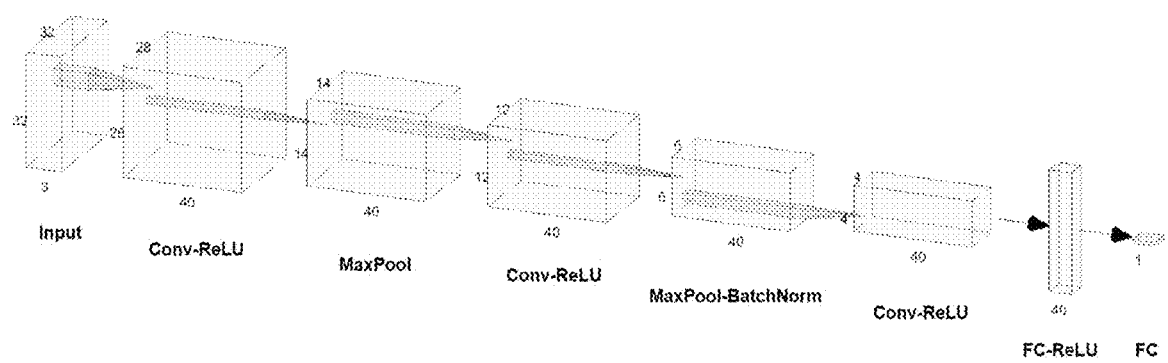
FIG. 11 depicts the architecture of the convolutional neural network used during pose estimation, in accordance with embodiments of the present invention.

As with the training of the Landmark Detector 312, the training of the convolutional neural network of the Pose Estimator Network 411 is performed using conventional means. The particular network architecture employed for the Pose Estimator Network 411 is illustrated by FIG. 11. The input image is passed through a series of convolution, rectified linear unit (ReLU) and Max pooling layers before using two fully connected layers separated by a rectified linear unit to produce the final predicted pose classification. A batch normalization layer included after the second max pooling layer helped to further improved the resulting pose classifications. Similarly to the Landmark Detector 312, the Pose Estimator Network 411 has been designed for maximal efficiency and minimal storage requirements, hence the use of pooling layers and shallow convolution layers.

Training the Feature Confidence Networks

In order to verify a given Hypothesis 230, the accuracy of its constituent feature location predictions must be assessed. To this end, a number of convolutional neural networks are trained and implemented by the Feature Confidence Networks process 412 (in FIG. 4), each of which is capable of producing a confidence score for a particular feature at a particular pose. In practice, the assessment of a mere subset of the features of a Hypothesis 230 is sufficient for accurate verification and helps to minimize the computational cost of the Hypothesis Evaluation process 420, aiding real-time performance. The selection of the particular feature subset is critical, however, because a reasonable spatial distribution must be ensured for accurate verification to be achieved.

As they will have been provided under unconstrained conditions, the head pose represented by given Hypotheses 230 will be highly variable, and, as such, the appearance of the features to be evaluated can also vary greatly between particular inputs. In practice, therefore, the Feature Confidence Networks 412 will include, in one embodiment, three sets of convolutional neural networks, one for each of the defined pose classifications for our preferred embodiment ("frontal", "left", and "right"), and each of these sets will have been trained using samples derived from the Augmented Training Data 203 that are known to represent faces at these respective poses. During Hypothesis Evaluation process 420 (of FIG. 5), the selection of a set of networks from the Feature Confidence Networks 412 to apply to the given Hypothesis 230 will be determined by either the Pose Estimator Network 411 or the Feature Tracker 211 that provides an estimation of head pose. The application of specialized networks during Hypothesis Evaluation 420 greatly improves the efficacy of the process.

No matter the pose set to which it belongs, the input to each network is an image patch, extracted from the given Image Frame 222 in a region centered on a particular location expressed by a Hypothesis 230. The output will be a single value in the [0,1] interval, which expresses confidence in the location prediction given by the Hypothesis 230 as being accurate.

The creation of the Feature Confidence Networks 412 is achieved through Confidence Networks Training process 404 (in FIG. 4), but there are a number of prior steps that must be taken in order to derive the data required for training from the Augmented Training Data 203. First, a method for creating feature samples must be established, which is implemented by the Feature Sampling process 402. Subsequently, the created samples must be used to form labeled training data for Confidence Networks Training process 404, which will involve displacing the samples and calculating corresponding confidence values through Feature Sample Displacement process 403.

Feature Sampling

Figure 12A:
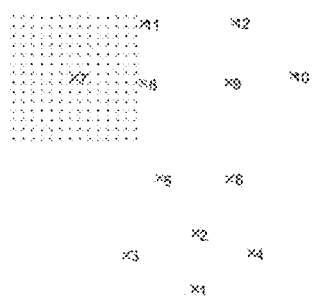
FIGS. 12A-12D illustrate the image-sampling process executed as a precursor to the calculation of hypothesis confidence during hypothesis evaluation, where 12A depicts a reference space for the confidence features as well as example of the image-sampling locations, 12B depicts these locations as they have been transformed onto the features of an individual, 12C depicts the result of sampling at the given locations around a particular feature, and 12D depicts result of normalizing the generated sample.

It is the objective of Feature Sampling process 402 to create training samples that are of the format required by the convolution neural networks of the Feature Confidence Networks 412. The first stage of the process is to define the regions around the particular features to be evaluated that will be sampled. This is a non-trivial problem, as it must be rotation and scale invariant, accounting for head pose and size variability, in order for consistent results to be achieved. The issue is solved through the utilization of a "reference face", which represents the mean average distribution of the features used during Hypothesis Evaluation process 420 expressed by the Augmented Training Data 203, given in a unit space. As illustrated by FIG. 12A, a sampling region is defined by a set of uniformly distributed sub-pixel locations around each feature of the reference face. In this connection, FIGS. 12A-12D illustrate the image-sampling process executed as a precursor to the calculation of hypothesis confidence during hypothesis evaluation, where 12A depicts a reference space for the confidence features as well as an example of the image-sampling locations, 12B depicts these locations as they have been transformed onto the features of an individual, 12C depicts the result of sampling at the given locations around a particular feature, and 12D depicts result of normalizing the generated sample.

Figure 12B:
Figure 12C:
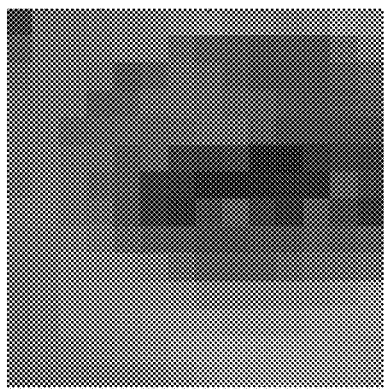

By aligning the features of the reference face to the corresponding locations within a given Hypothesis 230, a transformation is computed that can also be applied to the sampling points defined for each evaluated feature in the reference space. In this way, the sampling points for each feature can be determined in the coordinate space of the given Image Frame 222, a result of which is illustrated by FIG. 12B.

Once the sampling points have been determined, an Image Frame 222 can be sampled using the methods previously described for Face Region Sampling 303, as used during Hypothesis Generator Training 300, whereby bilinear interpolation (or any other interpolation method well-known in the field) is applied at the transformed locations across each region, yielding image samples. Application of this process to the points exhibited by FIG. 12B yields the feature sample depicted by FIG. 12C.

Figure 12D:
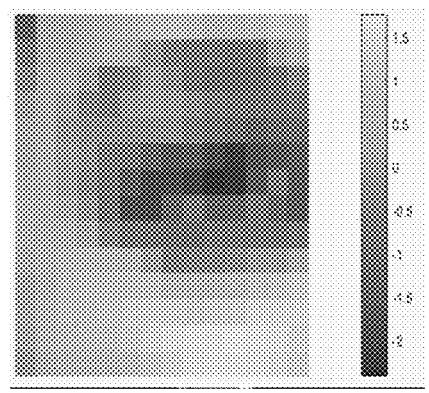

As before, to achieve robustness to the variable lighting conditions that unconstrained inputs will exhibit, the samples are normalized. Normalization is accomplished by using methods, discussed above, as applied during Face Region Sampling process 303, whereby samples are normalized such that each constituent channel exhibits zero-mean and unit standard deviation, using transformations described by Eq. 11 and Eq. 12, respectively. An example of a normalized feature sample is shown in FIG. 12D.

Feature Sample Displacement

As they are centered upon manually annotated feature locations expressed by the Augmented Training Data 203, the samples generated by Feature Sampling process 402 in their original forms will all represent examples of perfect accuracy and, therefore, perfect confidence values. In order for the Feature Confidence Networks 412 to learn an appropriate attribution of confidence values, the samples provided must themselves represent different degrees of accuracy and corresponding confidence values. Transforming the samples in this manner is achieved through Feature Sample Displacement process 403, the aim of which is to produce imperfect feature samples, to which imperfect scores will be attributed.

Creating such inaccurate samples is accomplished by systematically applying random displacements to the feature locations expressed by the Augmented Training Data 203. These displacements lead to the generation of feature samples that are not perfectly centered around the features to which they pertain. During Feature Sample Displacement process 403, the creation of a displaced sample begins with the randomized determination of the x and y components of the offset to be applied. Although the offset might be defined by a direct combination of uniformly distributed random x-dimension and y-dimension offsets, this offset would not necessarily result in a uniform distribution of displacements, and the presence of any such training data bias would be detrimental to the efficacy of the trained Feature Confidence Networks 412.

The components of the offsets are instead determined through the combination of randomly calculated angles and magnitudes. Where a is an angle, expressed in radians, and A and M are uniformly distributed random variables in the [0,1] interval that correspond, respectively, to angular displacement from the positive x-axis and the magnitude of Euclidean displacement from the given undisplaced feature location in each dimension, the x and y components of a computed offset are given by Eqs. 17-19.

$$a = A*2\pi \quad (17)$$

$$x = M*\cos(\alpha) \quad (18)$$

$$y = M*\sin(\alpha) \quad (19)$$

During the creation of displaced samples, the computed x and y components of an offset will be applied to the coordinates of all of the evaluation features given by the Augmented Training Data 203. It is around these new locations that the Feature Sampling process 402 is then be applied, which will yield the desired inaccurate samples. As required to create the corresponding confidence scores for these samples, the offset components also allow for the determination of an absolute displacement value ρ, which can be calculated through the application of Eq. 20.

$$\rho = \sqrt{x^2 + y^2} \quad (20)$$

The absolute displacement ρ cannot be used to directly calculate a corresponding confidence score, because the score can be derived only from a displacement that has been normalized with respect to the pixel resolution of the given input. Normalized displacement d is determined by scaling the absolute displacement ρ by a facial feature-relative factor f, such as a fraction of the absolute distance between the location of an eyebrow point and the upper-lip point. This calculation is given by Eq. 21.

$$d = \rho/f \quad (21)$$

The factor f, therefore, specifies the limit on permissible displacement, as an offset ρ greater than the given value of f will yield a relative displacement d greater than 1, which, semantically, signifies that the given displaced sample represents a wholly inaccurate feature prediction. This approach is implemented by deriving the actual feature confidence score c corresponding to a displacement, as given by Eq. 22.

$$c = \max(0, 1-d) \quad (22)$$

The application of Eq. 22 creates the training labels utilized during Confidence Networks Training process 404. In addition, feature samples derived from images within the Augmented Training Data 203 that depict no faces whatsoever are introduced to the training process and automatically assigned confidence scores of zero. This improves the robustness of the Feature Confidence Networks 412 to false positive feature samples.

Training a Feature Confidence Network

Figure 13:
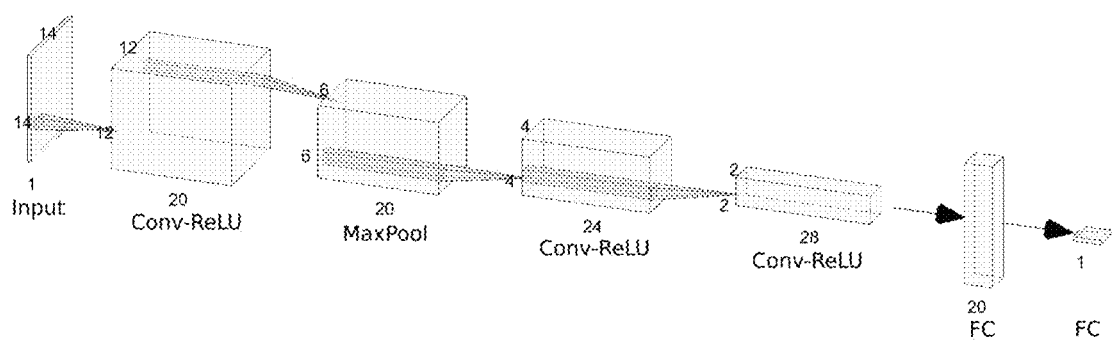
FIG. 13 depicts the architecture of the convolutional neural networks used during hypothesis evaluation to generate confidence scores, in accordance with embodiments of the present invention.

During Confidence Networks Training process 404, convolutional neural networks are employed to learn the relationship between the image data represented by the feature samples and the confidence score labels provided alongside them, as provided by the Feature Sampling 402 and Feature Sample Displacement 403 processes. The same network architecture is used for every feature within each pose set encapsulated by the Feature Confidence Networks 412, and this architecture is illustrated by FIG. 13, which depicts the architecture of the convolutional neural networks 412 used during hypothesis evaluation to generate confidence scores, in accordance with embodiments of the present invention. The networks have been designed with an emphasis on real-time performance and low storage requirements, hence the utilization of minimal numbers of trainable parameters. Each network takes image data, as provided by Feature Sampling process 402, as an input, and returns a single value in the range [0,1] from its final fully-connected layer as an output, which represents the predicted confidence score for the given input.

The training of the Feature Confidence Networks 412 is performed using the same methods applied during Landmark Detector Training process 304 and Pose Estimator Training process 401, and the output of the Confidence Networks Training process 404 is the Feature Confidence Networks 412 used during Hypothesis Evaluation 420. Our experiments indicate the performance of the resulting confidence networks exceeds the performance of the failure detection described in [6].

Real-Time Phase: Tracking Facial Features

Figure 6:
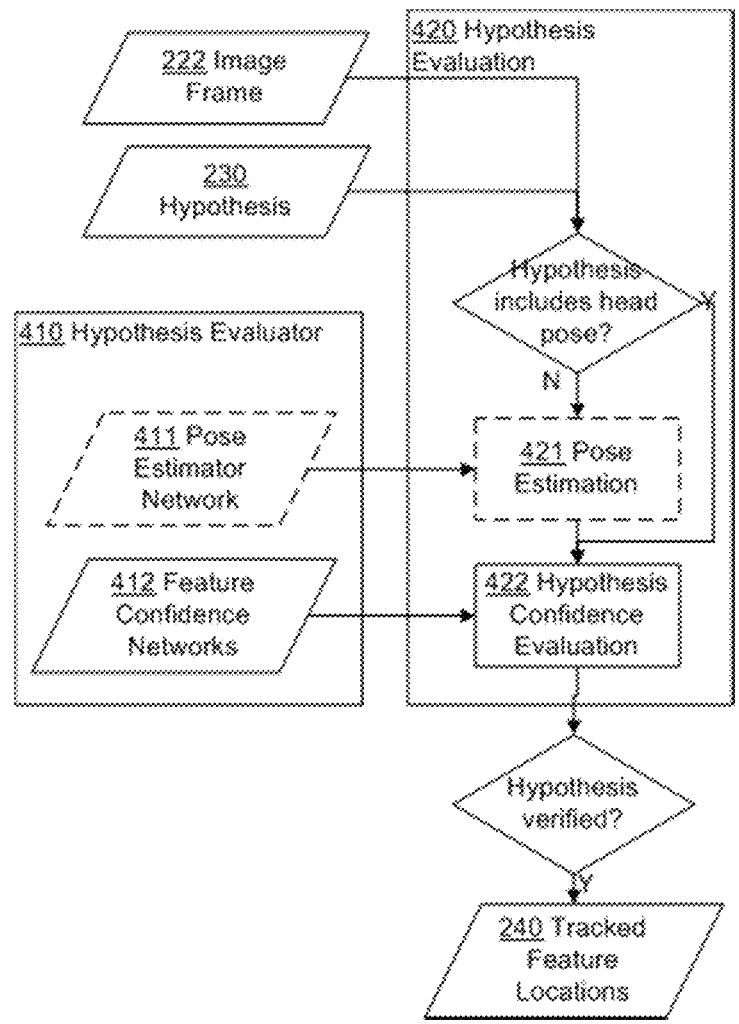
FIG. 6 is a flowchart depicting the process of evaluating a hypothesis using a hypothesis evaluator, in accordance with embodiments of the present invention.

Methods for using a trained Tracker 210 to produce a set of Tracked Feature Locations 240 given an Image Frame 222, or a sequence of them, are now described with additional reference to FIG. 5 and FIG. 6. FIG. 6 is a flowchart depicting the process of evaluating a hypothesis using a hypothesis evaluator, in accordance with embodiments of the present invention.

During execution of the Real-Time Phase 220 of FIG. 2, a set of Tracked Feature Locations 240 will, upon success, be returned for any given Image Frame 222, as provided by a camera or data storage device on either an individual or sequential, continuous basis through Image Capture 221. The Real-Time Phase 220 is a multi-stage process that involves using the constituent components of the Tracker 210 to generate, refine, and evaluate the facial feature hypotheses that constitute sets of Tracked Feature Locations 240.

For each Image Frame 222 provided by Image Capture process 221, a facial feature Hypothesis 230 is created that predicts the locations of a set of facial features. Two distinct methods are provided for creating a Hypothesis 230. If Tracked Feature Locations 240 were successfully generated for an Image Frame 222 immediately preceding the given present one, these feature locations can simply be retrieved from wherever they have been recorded or stored through Previous Location Retrieval process 223. If this is not the case, however, a new Hypothesis 230 can be generated from the current Image Frame 222 through the Hypothesis Generation process 320, which utilizes the trained Hypothesis Generator 310.

The Feature Tracker 211 component of the Tracker 210 is then employed to refine the given Hypothesis 230, using information expressed by the given Image Frame 222, through Hypothesis Refinement process 224. This process simply provides an updated Hypothesis 230, which still constitutes only a prediction of facial feature locations, rather than a definition. It is for this reason that Hypothesis Evaluation process 420 is then employed, which uses the trained Hypothesis Evaluator process 410 to verify that the given Hypothesis 230 is indeed accurate. Upon success, the Hypothesis 230 can be recorded as a set of Tracked Feature Locations 240, which can be used for application-level purposes, such as digital character animation, and to enable frame-to-frame tracking, constituting a new Hypothesis 230 for a subsequent Image Frame 222, as provided by Previous Location Retrieval 223.

Regardless of the result of Hypothesis Evaluation process 420, the Real-Time Phase process 220 dictates that the process will be succeeded by Image Capture 221, providing a new Image Frame 222 for which to generate Tracked Feature Locations 240, given the availability of further such input data.

The following sections describe how the constituent components of the Tracker 210 are utilized during execution of the Real-Time Phase process 220 to generate, refine, and evaluate a Hypothesis 230 in the pursuit of producing Tracked Feature Locations 240 for a given Image Frame 222.

Previous Location Retrieval

If Tracked Feature Locations 240 were successfully generated for an immediately preceding Image Frame 222, then Previous Location Retrieval process 223 can be employed to recall those feature locations from storage in order to provide a Hypothesis 230 for the given current Image Frame 222.

Given sufficient efficiency, in terms of time required to process any single Image frame 222, there is a high likelihood that the change in location for any given facial feature between two consecutive frames will be small enough that the Feature Tracker 211 can adequately account for it during Hypothesis Refinement process 224. Given this, and that the process of Previous Location Retrieval 223 is computationally trivial by comparison to Hypothesis Generation 320, Previous Location Retrieval 223 is the preferred option for creating a Hypothesis 230 for any given Image Frame 222.

Hypothesis Generation

Should Tracked Feature Locations 240 not exist for a preceding Image Frame 222, Previous Location Retrieval process 223 becomes non-viable. A Hypothesis 230 must, therefore, be created from only the data represented by the given Image Frame 222 itself, which is achieved through Hypothesis Generation process 320. Hypothesis Generation process 320 is a multi-stage process that leverages the individual components of a trained Hypothesis Generator process 310 to create a Hypothesis 230 from only an Image Frame 222.

Initially, the face depicted at an arbitrary location and pose within the given Image Frame 222 is delineated by the Face Detector process 311 through Face Detection process 321, which yields a Face Region 322. This data serves as input to the Landmark Detection process 323, which creates a sample of the region then fed to it through the neural network of the Landmark Detector 312. This sample of the region yields a set of values that, when transformed into the coordinate space of the Image Frame 222, constitutes a set of Detected Facial Features 324, which represent the physical locations of a small number of facial features.

The total number of facial features to be located by the system is far greater than the number that the lightweight neural network of the Landmark Detector process 312 can accurately provide while maintaining real-time performance, so a means for inferring a much more substantial set from the Detected Facial Features 324 is employed and is implemented by the Landmark Completion process 325. This phase of the Hypothesis Generation process 320 incorporates the 3D Head 313 component of the Hypothesis Generator process 310, which is a set of three-dimensional coordinates representing the distribution of features of an average human face. By transforming the Detected Facial Features 324 and aligning them to their corresponding points in the 3D Head 313, the locations of the other landmarks represented by the 3D Head 313 can be inferred in the two-dimensional space of the original Image Frame 222, yielding a complete Hypothesis 320.

Face Detection

Before facial features can be located within a given Image Frame 222, the face it depicts, if one exists, must be delineated, a result that is achieved through the Face Detection process 321 in Hypothesis Generation process 320. Face Detection process 321 is a multi-stage process that utilizes the Face Detector 311 component of the Hypothesis Generator process 310 to create a Face Region 322 and it begins with the preprocessing of provided inputs. Initially, a provided Image Frame 222 is converted to the grayscale colorspace before being rescaled to a fixed size. Subsequently, in-plane rotation is applied, whereby the image is rotated to a degree specified by a predefined list of rotation angles, which assists in the detection of faces that may be oriented at poses that would otherwise render them undetectable. This approach improves the overall robustness of the Face Detection process 321 in plane rotations without having to introduce greater variation to the training data of the Face Detector 311 during Face Detector Training process 302, which would greatly reduce its efficiency.

The boosted classifier utilized by the trained Face Detector process 311 is applied to the processed image at a variety of image locations and scales in order to determine the location of the face it depicts. A detected, axis-aligned Face Region is then transformed from the rotated image back to the image space of the current frame. The output of this process is a Face Region 322, which is a set of four two-dimensional points that represent the corners of a box that minimally encloses the region of the given Image Frame 222 that represents the face of an individual, expressed in the coordinate space of the Image Frame 222 prior to the described processing steps. Note that the Face Region may, or may not, be axis-aligned.

In the event of a failure to detect a face within an Image Frame 222, there exist a number of options. Firstly, Face Detection process 321 can be reattempted on the same Image Frame 222 using a different in-plane rotation angle from the predefined list. As Face Detection process 321 can be a relatively computationally expensive process, multiple detection attempts over the same Image Frame 222 may be undesirable. Alternatively, the Hypothesis Generation 320 process can be halted until a new Image Frame 222 is provided by Image Capture process 221, over which Face Detection process 321 can be performed at in-plane rotation angles different from those under which the previous input was unsuccessfully processed. This final option may be the most optimal, as it provides the robustness offered by rotation invariance as well as minimizing throughput times.

Landmark Detection

With a Face Region 322 provided by the Face Detection process 321, the Landmark Detector 312 can be employed to locate a small number of facial features, through Landmark Detection process 323. The Landmark Detection process 323 will produce a neural network-digestible image sample through the methods described for Face Region Sampling process 303, before feeding this data through the network itself. The mechanism for doing such processing is provided by numerous readily accessible, well-known libraries. The output generated by the network upon invocation, given input data, will be a set of values representing the coordinates of the facial features that were represented by the network training data, learned during Hypothesis Generator Training process 300.

As the network of the Landmark Detector process 312 was trained to learn coordinates that had been transformed into a normalized [−0.5,0.5] interval, the outputs it generates will be of a similar nature. The derivation of usable image-space feature locations is a two-step process, including un-normalizing the values and then transforming them from the sample-space back into the original image-space. Where x and y are normalized coordinates and m and n represent, respectively, the width and height of the image samples, the transformation back into sample-space can be described by Eq. 23 and Eq. 24.

$$x'=(x+0.5)*m \qquad (23)$$

$$y'=(y+0.5)*n \qquad (24)$$

Figure 14A:
FIGS. 14A-14B illustrate the results of detecting landmarks through the convolutional neural network, where
Figure 14B:
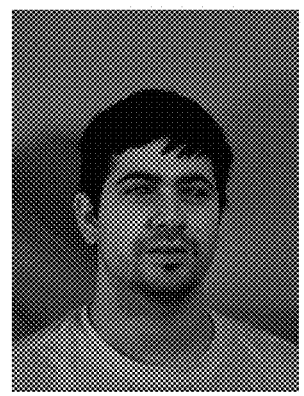

Given an image sample as depicted by FIG. 8C as an input, the neural network will yield values that, when un-normalized as above, represent the sample-space landmark locations illustrated by FIG. 14A. In this context, FIGS. 14A-14B illustrate the results of detecting landmarks through the convolutional neural network, where FIG. 14A depicts the landmarks that have been detected in the context of the normalized sample and FIG. 14B depicts the detected landmarks in the context of the original image. The subsequent transformation of the zero-indexed sample-space coordinates into the original zero-indexed image-space can be described by Eq. 25 and Eq. 26.

$$x'=(x*(w/m))+x_0 \qquad (25)$$

$$y'=(y*(h/n))+y_0 \qquad (26)$$

Here, $x_0$ and $y_0$ represent, respectively, the x and y coordinates of the corner of the provided Face Region 322 closest to the image origin, and w and h represent, respectively, the width and height, in pixels, of the Face Region 322 itself. The result of the above transformation is the set of Detected Facial Features 324 (in FIG. 5) for the given Image Frame 222. Applied to the sample-space landmarks illustrated by FIG. 14A, the above transformation will yield the original image-space Detected Facial Features 324 depicted by FIG. 14B.

Landmark Completion

A method that may be employed for the derivation of a substantial set of facial feature locations from a subset, such as the Detected Facial Features 324, in accordance with embodiments of the present invention, is encapsulated by the Landmark Completion process 325. As the training of an efficient convolutional neural network capable of accurately delineating a particularly broad set of facial features is intractable, the output of the Landmark Detection process 323 is merely a subset of the landmarks considered to constitute a complete Hypothesis 320. Landmark Detection process 323, therefore, acts primarily as a precursor to the Landmark Completion process 325, as it is this latter method that allows for the approximation of a much larger number of facial feature locations.

Figure 15:
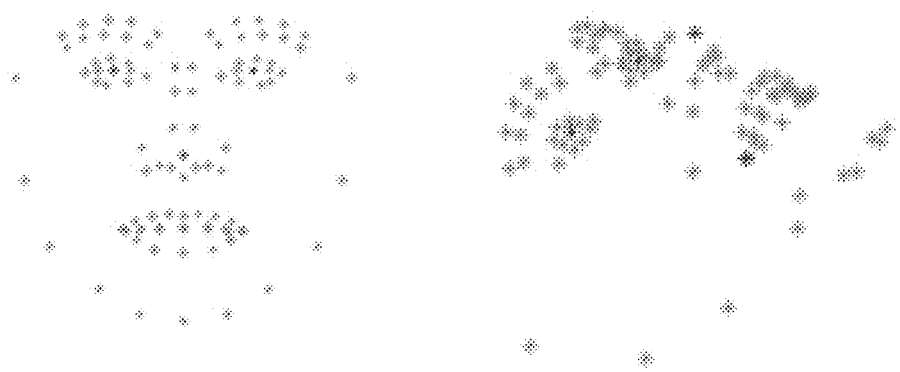
FIG. 15 illustrates, from two perspectives, the form of the three-dimensional character model to be fitted to the detected landmarks, where the landmarks corresponding to those that have been detected are highlighted.

FIG. 15 illustrates, from two perspectives, the form of the three-dimensional character model to be fitted to the detected landmarks, where the landmarks corresponding to those that have been detected are highlighted. It is assumed that if the Detected Facial Features 324 are accurate, then the locations of additional landmarks can be accurately determined by leveraging existing knowledge of facial feature distributions. In accordance with embodiments of the present invention, such knowledge is embodied by a 3D Head 313, as illustrated by FIG. 15, which includes a set of locations in three-dimension space, each of which corresponds to a particular facial feature. FIG. 15 additionally highlights the particular points within the distribution that semantically correspond to the Detected Facial Features 324. It is the correspondence of these particular points that forms the basis of the Landmark Completion process 325.

By fitting, in image space, the projection of the correspondence points of the 3D Head 313 to their respective counterparts represented by the Detected Facial Features 324, a transform is computed that can subsequently be applied to any additional landmarks associated with the model 3D Head 313. The fitting process itself is a non-linear optimization problem, the means of solving which will be known to any sufficiently skilled practitioner within the field, for example, as taught by Nocedal et al., "Numerical Optimization", (Springer-Verlag, 1999).

Figure 16:
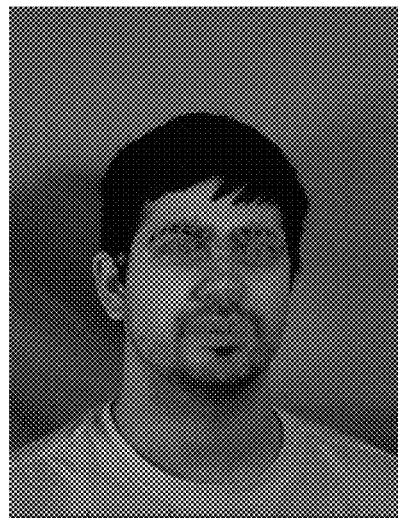
FIG. 16 depicts the result of projecting the landmarks of the fitted model back into the original image space, yielding the complete landmark hypothesis.

Application of the derived transform to the additional landmarks of the 3D Head 313 will allow for them to be projected back into the two-dimensional image-space, yielding physical locations that approximate the locations of facial features within the given Face Region 322. Doing such to the entire set of landmarks expressed by the 3D Head 313 will yield the output of the Landmark Completion process 325, a completed facial feature Hypothesis 320 for the given Image Frame 222. The Hypothesis 320 generated for an example Image Frame 222 is illustrated by FIG. 16, which depicts the result of projecting the landmarks of the fitted model back into the original image space, yielding the complete landmark hypothesis.

Landmark Completion Calibration

The accuracy of a Hypothesis 230 yielded by Landmark Completion process 325 can be improved by using a 3D Head 313 that specifically represents the three-dimensional shape of the head of the current user of the system, rather than an average head shape. Several methods of obtaining a three-dimensional representation of the head of a user exist, and all methods are within the scope of this invention. In one embodiment only a monocular image is required for the derivation of a representation, but in other embodiments this approach is trivially modified to take advantage of available depth sensors, for instance.

As well as serving to guide the Feature Confidence Networks 412 during Hypothesis Evaluation process 420, the Pose Estimator Network 411 can be employed to determine whether previously produced Tracked Feature Locations 240 represent frontal head poses with neutral expressions, from which a user specific 3D Head 313 can be accurately derived.

Alternatively, frontal Tracked Feature Locations 240 that may not necessarily represent neutral expressions can be processed by the Neutral Hypothesis Predictor 314 in order for any expression-derived shape variation to be removed. As was the case during Neutral Hypothesis Predictor Training process 305, a given set of feature locations must first be normalized and aligned to a reference distribution before being concatenated into a vector that can be fed through the network of the Neutral Hypothesis Predictor 314. Upon invocation, the network will return a set of reference space coordinates that represent the given feature location distribution without any facial expression. By applying the inverse of the reference space transform, the neutral feature location distribution in the coordinate space of the given Image Frame 222 can be determined.

Given the selected set of Tracked Feature Locations 240, explicitly expression-neutralized using the Neutral Hypothesis Predictor 314 or otherwise, projective geometry is used to fit the average 3D Head 313 to the expressed locations, which yields an estimate of the head pose. By applying the head pose to the average 3D Head 313, and then transforming the result into camera space, a "calibrated" 3D Head 313 can be created from the x and y coordinates of the given Tracked Feature Locations 240 and the z coordinates of the transformed average 3D Head 313 that will project perfectly onto the Tracked Feature Locations 240. The calibrated 3D Head 313, after transformation back into its model space, can be used in subsequent executions of the Landmark Completion 325 process to provide more accurate Hypotheses 230 for the given user without the necessity of rerunning this calibration procedure.

Hypothesis Refinement

A facial feature Hypothesis 320, whether provided by Previous Location Retrieval process 223 or Hypothesis Generation process 320, constitutes merely a prediction of the locations of the facial features depicted by a given Image Frame 222. In fact, no matter which process has provided the Hypothesis 230, the most recent step in its creation will not have taken into account information expressed by the current Image Frame 222. In the case of Previous Location Retrieval process 223, this is because the locations relate to the preceding Image Frame 222, whereas Landmark Completion process 325, the final stage of Hypothesis Generation 320, is an optimization process concerned only with the distribution of the locations themselves.

Hypothesis Refinement 224 process is, therefore, employed to consider the underlying data expressed by the given Image Frame 222, using it to improve the accuracy of the locations represented by the given Hypothesis 320, which is achieved through utilization of the Feature Tracker 211 component of the Tracker 210. Using the update model of a sufficiently capable Feature Tracker 211, such as that described in our Prior Patent, U.S. Pat. No. 9,104,908, each location expressed by a Hypothesis 320 can be displaced to more accurately represent the location of the feature to which it pertains within the current Image Frame 222. The output of the Hypothesis Refinement process 224 is simply another Hypothesis 230 and, as such, can be used for an arbitrary number of iterations during the processing of any given Image Frame 222.

Typically, the maximum displacement allowed for any single location update will be restricted to a small number of pixels, for which there is a number of reasons. Firstly, the sampling process required by the update model of the Feature Tracker 211 can become computationally expensive, especially if the number of Hypothesis Refinement 224 iterations is increased. Secondly, it is assumed that the Hypothesis 230 provided will not be overly inaccurate in its unrefined state, and that small updates are sufficient for improving accuracy. Lastly, a limit on displacement will also reduce the likelihood of updates to inaccurate locations and restrict the deformation of the distribution as a whole.

As previously established, the adopted Feature Tracker 211 may also be capable of returning the head pose information required by the Feature Confidence Networks 412 during Hypothesis Evaluation 420, which can be provided alongside the Hypothesis 230 after Hypothesis Refinement 224.

Conceptually, it is the provision of a Hypothesis 230 from the Previous Location Retrieval process 223 and the subsequent updating of it through the Hypothesis Refinement process 224 that enables frame-to-frame feature tracking, and allows for tracking throughout entire video sequences. Furthermore, Hypothesis Refinement process 224 improves the robustness of the entire tracking process by correcting the inaccuracies expressed by Hypotheses 230, whether provided by Previous Location Retrieval process 223 or Hypothesis Generation process 320, enabling desirable behavior given unconstrained inputs.

Hypothesis Evaluation

Before being accepted as Tracked Feature Locations 240, the accuracy of the Hypothesis 230 created by Hypothesis Generation process 320 and updated though Hypothesis Refinement process 224 must be evaluated by way of the Hypothesis Evaluation process 420.

Hypothesis Evaluation process 420 is performed by two stages as shown in FIG. 4. First, the Pose Estimator Network 411 component of the Hypothesis Evaluator 410 is employed during the Pose Estimation 421 stage to establish which head pose range (such as "frontal", "left", or "right") the Hypothesis 230 being evaluated represents, although it is possible that the particular Feature Tracker 211 employed to execute the Hypothesis Refinement 224 process returns sufficient information for head pose to be determined without any use of a Pose Estimator Network 411.

Regardless, the head pose classification ascertained inform the second stage of Hypothesis Evaluation 420, Hypothesis Confidence Evaluation 422, which involves providing the Feature Confidence Networks 412 with samples of certain facial features at the locations defined by the given Hypothesis 230. The Feature Confidence Networks 412 return a confidence score for each provided feature sample, and a semantic score-grouping mechanism is employed to efficiently and robustly verify the accuracy of the Hypothesis 230. In the case of successful verification, the Hypothesis Evaluation process 420 yields a set of Tracked Feature Locations 240.

Pose Estimation

As described, the head pose classification required by the Feature Confidence Networks 412 can potentially be provided by the adopted Feature Tracker 211. Where this is not feasible, then the classification can instead be provided by the Pose Estimation process 421 of FIG. 6. As per Pose Estimator Training 401, for any given Hypothesis 230 to be evaluated, a bounding box will be derived from the constituent feature locations that will represent a face region, to be sampled through the methods established for Face Region Sampling process 303. This process will yield data that the Pose Estimator Network 411 can digest, and allow it to return, upon invocation, a head pose classification, to be provided to the Hypothesis Confidence Evaluation 422 process.

Hypothesis Confidence Evaluation

The Feature Confidence Networks 412 have three sets of feature-evaluating convolutional neural networks, one for each of the three classifications of pose defined for the system. With the provision of a pose classification from either Pose Estimation process 421 or the Hypothesis 230 itself, as given by a capable Feature Tracker 211, the set appropriate for the given Hypothesis 230 can be selected. The set includes a number of neural networks, each of which corresponds to a particular feature represented by a Hypothesis 230, although the number of features referred to for the evaluation process will be smaller than the total number any given Hypothesis 230 will represent, for the sake of computational efficiency and avoiding redundancy. Each network is capable of quantifying the accuracy of the feature location prediction expressed by a given Hypothesis, with respect to the underlying Image Frame 222, during Hypothesis Confidence Evaluation process 422.

For each feature to be evaluated, an image sample is generated using the methods applied during Hypothesis Evaluator Training process 400, as implemented by Feature Sampling process 402. Each sample created is then passed through its respective neural network from the Feature Confidence Networks 412, which will yield a set of feature confidence scores.

The computed scores are then further processed in order to verify the given Hypothesis 230. This first involves splitting the scores into a number of semantically related groups. For example, the scores of the evaluated features pertaining to a nose would be assigned to the "nose" group. In the case of "frontal" pose classification, the four groups that the feature scores are divided into within our preferred embodiment are labelled as "left eye", "right eye", "nose", and "mouth". A mean feature confidence score will be calculated for each of these groups, which will then be compared to a predetermined threshold value, whereby a score greater than the threshold will result in the successful verification of the given group. If every group for the given Hypothesis 230 is successfully verified, then the output of Hypothesis Confidence Evaluation process 422, and of the overall Hypothesis Evaluation process 420, is a set of Tracked Feature Locations 240 for the given Image Frame 222.

The grouping mechanism offers a number of benefits to both efficiency and robustness, improving performance under unconstrained conditions. If the mean score of a group is recalculated after the evaluation of each constituent feature, a score exceeding the given threshold may be determined prior to the evaluation of every single feature within that group, meaning remaining evaluations can be safely skipped, saving time. Conversely, if it becomes impossible for the given threshold to be exceeded by the mean score of a group after the evaluation of a number of inaccurate feature location predictions, then the remaining evaluations can be foregone, as can the evaluation of subsequent groups.

Furthermore, the grouping process makes it possible for a small number of features to fail without causing the overall verification process to fail, which offers a degree of robustness to the occlusion of features while maintaining the requirement for accurate feature location predictions to exist across all regions of the face.

In certain embodiments of the present invention, further robustness to occlusion can be achieved by allowing certain combinations of groups to fail without the given Hypothesis 230 being entirely rejected. In addition, further gains to efficiency can be made by determining which groups are empirically more liable to fail under typical circumstances, as groups more likely to fail can be evaluated earlier in the Hypothesis Confidence Evaluation process 422, allowing for inaccurate Hypotheses 230 to be rejected with minimal computational expense.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof.

Computer program logic implementing all or part of the functionality previously described herein may be embodied in various forms, including, but in no way limited to, a source code form, a computer executable form, and various intermediate forms (e.g., forms generated by an assembler, compiler, networker, or locator.) Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies, networking technologies, and internetworking technologies. The computer program may be distributed in any form as a removable storage medium with accompanying printed or electronic documentation (e.g., shrink wrapped software or a magnetic tape), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

While the invention has been particularly shown and described with reference to specific embodiments, it will be understood by those skilled in the art that various changes in form and detail may be made therein without departing from the spirit and scope of the invention as defined by the appended clauses. While some of these embodiments have been described in the claims by process steps, an apparatus comprising a computer with associated display capable of executing the process steps in the claims below is also included in the present invention. Likewise, a computer program product including computer executable instructions for executing the process steps in the claims below and stored on a computer readable medium is included within the present invention.

The embodiments of the invention described above are intended to be merely exemplary; numerous variations and modifications will be apparent to those skilled in the art. All such variations and modifications are intended to be within the scope of the present invention as defined in any appended claims.

REFERENCES

[1] Zhang, K., Zhang, Z., Li, Z., & Qiao, Y. (2016). Joint face detection and alignment using multi-task cascaded convolutional networks. IEEE Signal Processing Letters, 23(10), 1499-1503

[2] Viola, P., Jones, M.: Robust real-time face detection. IJCV (2004)

[3] Felzenszwalb, P., Girshick, R., McAllester, D., Ramanan, D.: Object detection with discriminatively trained part-based models. PAMI (2010)

[4] J. Yang, Q. Liu, and K. Zhang. Stacked Hourglass Network for Robust Facial Landmark Localisation. In Proceedings of the International Conference on Computer Vision & Pattern Recognition (CVPRW)

[5] Grigorios G. Chrysos et al. A Comprehensive Performance Evaluation of Deformable Face Tracking "In-the-Wild" Int J Comput Vis (2018) 126:198-232 [6] A. Steger, R. Timofte, and L. Van Gool. Failure detection for facial landmark detectors. arXiv:1608.06451, 2016.

[7] Yoav Freund and Robert E. Schapire. A decision-theoretic generalization of on-line learning and an application to boosting. In Computational Learning Theory: Eurocolt '95, pages 23-37. Springer-Verlag, 1995.

[8] Yen-Yu Lin and Tyng-Luh Liu. Robust Face Detection with Multi-Class Boosting. 2005 IEEE Computer Society Conference on Computer Vision and Pattern Recognition

What is claimed is:

1. A computer implemented method for generating a set of feature locations characterizing a face of an animal subject from an unconstrained video sequence that constitutes a physical record of the face of the subject, the method implemented using computer processes comprising:
   in a face-detecting process, delineating, by way of region-bounding coordinates, the face of the subject within an image selected from the sequence;
   detecting, in the selected image, a small set of landmarks, the set having fewer than 10 landmarks, corresponding to the face of the subject, using a convolutional neural network, trained to take as input an image region corresponding to the face of the subject and to return a set of coordinates at computational speeds approximating real time;
   projectively fitting a three-dimensional character model to the detected landmarks, and using the fitted model to estimate physical locations of additional landmarks, so as to provide a complete hypothesized set of facial landmarks; and
   in a calibration process and using a set of tracked feature locations, refining the three-dimensional character model so that it more closely matches a shape of a head of the subject; and
   in a feature tracker process, updating the hypothesized set of facial landmarks to improve convergence between predicted feature locations and their actual physical locations based on data sampled from the selected image.

2. A computer-implemented method in accordance with claim 1, the computer processes further comprising:
   training the convolutional neural network with images augmented with synthetic lighting.

3. A computer-implemented method in accordance with claim 1, the computer processes further comprising:
   training the convolutional neural network with images augmented with changes to background.

4. A computer-implemented method in accordance with claim 1, the computer processes further comprising:
   training the convolutional neural network with images augmented with motion blur.

5. A computer-implemented method of evaluating a facial feature hypothesis, associated with an image including a face, the method objectively evaluating confidence in the hypothesis, the method implemented by computer processes comprising:

a. extracting, from the image, a set of texture patches, each patch centered on a feature within the hypothesis and oriented and scaled with reference to the face;
b. normalizing the patches;
c. passing each one of the normalized patches through a confidence-scoring convolution neural network trained to predict a confidence score indicating an extent to which the feature to which such patch corresponds is correctly positioned; and
d. combining the confidence scores for each of the facial features to give an overall confidence score for the hypothesis.

6. A computer-implemented method in accordance with claim 5, the computer processes further comprising:
using a lightweight convolutional neural network to estimate an approximate head pose associated with the facial feature hypothesis; and
using the estimated head pose to select the confidence-scoring convolution neural network from a set of confidence-scoring convolution networks, each confidence-scoring convolution network in the set being associated with a distinct head pose range.

7. A computer-implemented method in accordance with claim 5, the processes further comprising:
training the confidence-scoring convolutional neural network with images augmented with synthetic lighting.

8. A computer-implemented method in accordance with claim 5, the processes further comprising:
training the confidence-scoring convolutional neural network with images augmented with changes to background.

9. A computer-implemented method in accordance with claim 5, the processes further comprising:
training the convolutional neural network with images augmented with motion blur.

* * * * *

UNITED STATES PATENT AND TRADEMARK OFFICE
CERTIFICATE OF CORRECTION

PATENT NO. : 10,949,649 B2
APPLICATION NO. : 16/282989
DATED : March 16, 2021
INVENTOR(S) : Walker et al.

Page 1 of 1

It is certified that error appears in the above-identified patent and that said Letters Patent is hereby corrected as shown below:

In the Claims

In Column 28, Line 41:
Delete "and"

Signed and Sealed this
Eighteenth Day of May, 2021

Drew Hirshfeld
*Performing the Functions and Duties of the*
*Under Secretary of Commerce for Intellectual Property and*
*Director of the United States Patent and Trademark Office*